(12) United States Patent
Gross et al.

(10) Patent No.: US 11,713,060 B2
(45) Date of Patent: Aug. 1, 2023

(54) SYSTEMS AND METHODS FOR REMOTE MONITORING OF A VEHICLE, ROBOT OR DRONE

(71) Applicant: Guident Ltd., London (GB)

(72) Inventors: Clifford M. Gross, Miami, FL (US); Harald Braun, Highland Beach, FL (US); Gabriel Castaneda, Pompano Beach, FL (US); Michael J. Trank, Pompano Beach, FL (US)

(73) Assignee: Guident Ltd., London (GB)

(\*) Notice: Subject to any disclaimer, the term of this patent is extended or adjusted under 35 U.S.C. 154(b) by 115 days.

(21) Appl. No.: 17/025,152

(22) Filed: Sep. 18, 2020

(65) Prior Publication Data

US 2022/0089181 A1 Mar. 24, 2022

(51) Int. Cl.
*B60W 60/00* (2020.01)
*B60W 50/14* (2020.01)
(Continued)

(52) U.S. Cl.
CPC .......... *B60W 60/005* (2020.02); *B60W 50/14* (2013.01); *B60W 60/0016* (2020.02);
(Continued)

(58) Field of Classification Search
CPC ............... B60W 60/005; B60W 50/14; B60W 60/0016; B60W 2050/146;
(Continued)

(56) References Cited

U.S. PATENT DOCUMENTS 8,874,301 B1 10/2014 Rao et al.
9,120,484 B1 9/2015 Ferguson et al.
(Continued)

FOREIGN PATENT DOCUMENTS

EP 3124348 A1 2/2017
EP 3401786 A2 11/2018
(Continued)

OTHER PUBLICATIONS

Notification of Transmittal of the International Search Report and the Written Opinion of the International Searching Authority, or the Declaration, International Search Report, Written Opinion of the International Searching Authority for PCT Application No. PCT/US2020/021171, dated Jun. 10, 2020.
(Continued)

*Primary Examiner* — James J Lee
*Assistant Examiner* — Andrew Sang Kim
(74) *Attorney, Agent, or Firm* — Ellenoff Grossman & Schole LLP; Stephen L. Keefe; John C. Stellabotte

(57) ABSTRACT

A system is disclosed. The system has a control module, comprising computer-executable code stored in non-volatile memory, a processor, a control center device, and a plurality of autonomous devices that operate remotely from the control center device, each of the plurality of autonomous devices including a control device. The control module, the processor, the control center device, and the control devices are configured to collect data using one or more collection devices disposed at each of the plurality of autonomous devices, process the collected data using the control devices disposed at the plurality of autonomous devices, transfer the processed data from the control devices to the control center device when the plurality of autonomous devices are autonomously operating without control by the control center device, and train artificial intelligence as a function of the processed data transferred from the control devices.

27 Claims, 9 Drawing Sheets

(51) Int. Cl.
  *G05B 13/02* (2006.01)
  *G05D 1/00* (2006.01)
  *G07C 5/00* (2006.01)
  *G07C 5/08* (2006.01)
  *H04N 7/18* (2006.01)
  *H04N 7/14* (2006.01)
(52) U.S. Cl.
  CPC ....... *G05B 13/0265* (2013.01); *G05D 1/0011* (2013.01); *G07C 5/008* (2013.01); *G07C 5/0841* (2013.01); *H04N 7/183* (2013.01); *B60W 2050/146* (2013.01); *B60W 2420/42* (2013.01); *B60W 2556/55* (2020.02); *B60W 2556/60* (2020.02); *H04N 7/141* (2013.01)
(58) Field of Classification Search
  CPC ......... B60W 2420/42; B60W 2556/55; B60W 2556/60; G05B 13/0265; G05D 1/0011; G07C 5/008; G07C 5/0841; H04N 7/183; H04N 7/141
  See application file for complete search history.

(56) References Cited

U.S. PATENT DOCUMENTS

| | | | |
|---|---|---|---|
| 9,429,943 B2 | 8/2016 | Wilson et al. | |
| 9,475,496 B2 | 10/2016 | Attard et al. | |
| 9,964,948 B2 | 5/2018 | Ullrich et al. | |
| 10,166,994 B1 | 1/2019 | Fields et al. | |
| 10,185,327 B1* | 1/2019 | Konrardy | B60P 3/12 |
| 10,564,638 B1* | 2/2020 | Lockwood | G05D 1/00 |
| 10,699,580 B1 | 6/2020 | Gross | |
| 10,850,693 B1* | 12/2020 | Pertsel | G05D 1/0088 |
| 2009/0105902 A1 | 4/2009 | Choi et al. | |
| 2014/0052323 A1 | 2/2014 | Reichel et al. | |
| 2016/0249180 A1* | 8/2016 | Li | H04B 1/3822 |
| 2017/0090476 A1 | 3/2017 | Letwin et al. | |
| 2017/0192423 A1 | 7/2017 | Rust et al. | |
| 2017/0192426 A1 | 7/2017 | Rust et al. | |
| 2017/0274906 A1 | 9/2017 | Hassan et al. | |
| 2017/0278305 A1* | 9/2017 | Sisbot | G06F 3/167 |
| 2018/0102001 A1* | 4/2018 | Faust | G05D 1/0088 |
| 2018/0330624 A1* | 11/2018 | Gong | H04W 12/64 |
| 2018/0354411 A1 | 12/2018 | Friedland et al. | |
| 2019/0011910 A1* | 1/2019 | Lockwood | G05D 1/0038 |
| 2019/0011931 A1 | 1/2019 | Selvam et al. | |
| 2019/0049948 A1* | 2/2019 | Patel | G05D 1/0276 |
| 2019/0187691 A1* | 6/2019 | Magzimof | G05D 1/0055 |
| 2020/0019166 A1* | 1/2020 | Fairfield | G05D 1/0027 |
| 2020/0062250 A1 | 2/2020 | Boulton | |
| 2020/0326669 A1* | 10/2020 | Penna Santana | G06N 20/10 |
| 2021/0300356 A1* | 9/2021 | Paudel | G06N 3/08 |

FOREIGN PATENT DOCUMENTS

| | | |
|---|---|---|
| WO | 2015099679 A1 | 7/2015 |
| WO | 2018175808 A1 | 9/2018 |
| WO | 2018232032 A1 | 12/2018 |
| WO | 2019147569 A1 | 8/2019 |
| WO | 2019180700 A1 | 9/2019 |

OTHER PUBLICATIONS

International Search Report and Written Opinion, PCT/IB2020/050548, dated Apr. 22, 2020.
PCT Patent Application No. PCT/US2020/021171 filed on Mar. 5, 2020.
International Search Report and Written Opinion, PCT/US20/21171, dated Jun. 10, 2020.
"Waymo Self-Driving Taxi Goes Rogue, Blocking Traffic & Evading Capture" by Johnna Crider dated May 13, 2021, in CleanTechnica.
"Cruise autonomous vehicle with no human driver pulled over by San Francisco police" by Bloomberg dated Apr. 12, 2022, in Automotive News.
Extended European Search Report issued for European Patent Application No. EP21196077.8, dated Feb. 15, 2022.

* cited by examiner

SYSTEMS AND METHODS FOR REMOTE MONITORING OF A VEHICLE, ROBOT OR DRONE

TECHNICAL FIELD

The present disclosure is directed to a system and method for remote monitoring and controlling, and more particularly, to a system and method for remote monitoring and controlling of vehicles, robots, or drones.

BACKGROUND OF THE DISCLOSURE

Autonomous vehicles (AVs), robots or drones use various computer processing systems to control operation of the autonomous unit. Autonomous vehicles may utilize an initial input from an operator, such as a pilot, driver, or passenger to engage the autonomous operation system and then operate thereafter in modes with varying degrees of human input ranging from SAE J3016 Level 3 to Level 4 or 5 autonomous mode (where the vehicle essentially drives by itself) to permitting a human operator to fully override the autonomous mode and have full manual control over the unit, and the full range of modes between the two extremes, with the potential for intermittent human input and control. Autonomous vehicles, robots or drones may include sensors, cameras, sonar, and radar to detect cars, pedestrians, and their respective proximities and characteristics. They may also rely on Global Positioning Systems (GPS) for navigation and other forms of communication technologies based on sensoric or Near Field Communication (NFC), including NFC peer-to-peer, which enables two NFC-enabled devices to communicate with each other to exchange information in an ad hoc fashion up to a distance up to 20 to 30 cm. The detection and identification of objects and information related to objects and navigation capabilities contribute to the safe operation of autonomous units.

There is a high degree of uncertainty about the safety of autonomous units using AI, which hampers mass adaption of Level 4 or Level 5 AVs. Regulatory criteria in some jurisdictions make it mandatory to have back-up human operators taking control of an AV in the event of an accident or mishap. These operators may be in the vehicle or located remotely.

Some method and system implementations for operating an autonomous vehicle include collision avoidance systems adapted to relieve drivers from the moment-to-moment decision making involved in driving, while seeking to avoid collisions. For example, U.S. Pat. No. 9,429,943, filed by Florida A&M University, describes artificial intelligence valet (AIV) systems and methods adapted to control vehicles based on cognitive and control techniques. The artificial intelligence valet (AIV) system can include current mobile technology, fuzzy logic, and neural networks that enable the vehicle to navigate to the vehicle's user. While an autonomous vehicle is operating under AIV control, the AIV system can recognize when a collision with an object such as, e.g., a human, an animal, another car, or any combination thereof is inevitable due to unforeseen situations. In response to such a determination, evasive actions can be initiated to intelligently avoid the collision or, in the worst-case scenario, to decide which object to collide with if faced with an inevitable collision. After the collision, the collision avoidance system can initiate a call to emergency services and safely park the autonomous unit. In some implementations, the vehicle may be parked without emergency services being contacted if no injury has occurred. However, U.S. Pat. No. 9,429,943 does not specifically address the complexities of monitoring multiple independent autonomous units, taking control of one or more of the independent autonomous units to govern the unit's operation, and returning control to the one or more independent autonomous units when safe operation is restored.

Although the safety of autonomous unit operation has improved, the potential for dangerous autonomous unit safety shortfalls remains. In some autonomous unit scenarios, unsafe conditions can result from malfunction of sensors, or software's inability to resolve unforeseen situations (e.g., dead-lock situations involving pedestrians in a mixed-use street), security concerns resulting from the absence of a driver, and the missing option for a passenger to ask a driver or attendant for information or assistance.

Some autonomous vehicle implementations include methods and systems to help increase safety and consumer satisfaction with autonomous vehicles and help bridge the gap towards complete autonomy. For example, U.S. Pat. No. 9,964,948, filed by The Florida International University Board of Trustees, describes methods and systems for assisting autonomous vehicles. A method for assisting autonomous vehicles can include providing an autonomous vehicle having sensory inputs and providing a remote-control center having two-way communication with the autonomous vehicle. The autonomous vehicle can send its sensory input information to the control center and the control center can send control information to the autonomous vehicle. However, U.S. Pat. No. 9,964,948 does not specifically address the complexities of monitoring multiple independent autonomous units, taking control of one or more of the independent autonomous units to govern the vehicles' operation when a dangerous operating safety condition is detected, and returning control to the one or more independent autonomous units when safe operation is restored.

Notwithstanding the substantial effort that goes into designing autonomous vehicles so that they can be operated safely, there will be instances where incidents, such as collisions, accidents, and other emergency conditions occur. Collisions, accidents, and other emergency conditions can result in additional problems when vehicles are operating autonomously.

Automated vehicle systems also include safe shut down and emergency response and accident reporting modes. For example, U.S. Pat. No. 8,874,301 describes a vehicle with autonomous driving control that has a set up mode, active drive mode, safe shutdown mode, and emergency response mode.

Such collision avoidance and accident reporting systems could be improved by making more precise assessments of the nature of the injuries and damage that has occurred following an incident, including more precise assessments of the number of vehicles, passengers, pedestrians, animals and objects involved and the nature of the injuries and damage to them.

Some automated vehicle examples include methods and systems for transferring control of an automated vehicle to a passenger or emergency responder, in the event of an accident or emergency. For example, U.S. Pat. No. 10,699,580 filed by Guident, Ltd., describes methods and systems for transferring control of an automated vehicle to a passenger or emergency responder in the event of an accident or emergency. The system can be used in conjunction with automated vehicle artificial intelligence systems operating with collision or incident avoidance, and improved accident or emergency reporting. A distributed information system (DISS) receives information from a plurality of distributed sensors in a single autonomous vehicle, determines the existence of an incident based upon the information received from the plurality of distributed sensors, determines vehicles, passengers, and pedestrians, animals and objects involved in the incident and the nature of the injuries and damages to the vehicles, passengers, and pedestrians, animals and objects involved in the incident based on the information received from the sensors, determines if the autonomous vehicle can be safely moved autonomously from a location where the incident occurred to a second location, and if the autonomous vehicle can safely be moved to the second location, then autonomously moves the vehicle to the second location and parks the vehicle. The methods and systems described by U.S. Pat. No. 10,699,580 may integrate different information types received from different sensor types using novel sensor fusion techniques, to determine the existence of an incident, determine vehicles, persons, animals, or objects involved, and determine if the single autonomous vehicle can safely be moved. However, U.S. Pat. No. 10,699,580 does not specifically address the complexities of monitoring multiple independent autonomous units, taking control of one or more of the independent autonomous units to govern the unit's operation when a dangerous operating safety condition is detected, and returning control to the one or more independent autonomous units when safe operation is restored.

There may be instances where an automated vehicle may not be able to be parked safely autonomously and emergency responders may need to be notified. For example, if an autonomously operated vehicle gets in an accident in a busy intersection or highway, where other cars will be driving, the autonomously operated vehicle may need to be shut down to prevent additional damage or injury. The autonomous vehicle may also need to be moved out of the way autonomously or manually so that traffic can proceed, and to ensure the safety of the autonomous vehicle passengers, other drivers, and pedestrians.

Some autonomous vehicle implementations include methods and systems to share data across vehicles for improved safety in scenarios presenting an autonomous vehicle with an occluded object. For example, PCT Patent Application PCT/US19/14547, filed by the Board of Trustees of Michigan State University, the disclosure of which, describes distributed object detection based on sensor data shared across multiple autonomous vehicles using sensor fusion techniques. PCT/US19/14547 also describes a collision avoidance system configured to automatically brake one or more of the multiple autonomous vehicles based on the object detection. However, PCT/US19/14547 does not specifically address the complexities of monitoring multiple independent autonomous units, taking control of one or more of the independent autonomous units to govern the unit's operation when a dangerous operating safety condition is detected, and returning control to the one or more independent autonomous units when safe operation is restored.

The PCT Patent Application PCT/US2020/021171 describes AI methods and systems for remote monitoring and control of autonomous vehicles. However, PCT/US2020/021171 does not describe improvements described herein to the device and processing circuitry in an autonomous vehicle, robot, or drone to implement such methods and systems. Also, PCT/US2020/021171 does not describe improvements described herein to methods such device can implement to communicate to a remote monitoring control center predict when one or more autonomous vehicles, robots or drones are to be remote controlled, take control when necessary, and return control to the one or more independent autonomous unit when safe operation is restored.

This section provides background information related to the present disclosure, which Applicant does not concede is prior art.

The exemplary disclosed system and method of the present disclosure is directed to overcoming one or more of the shortcomings set forth above and/or other deficiencies in existing technology.

SUMMARY OF THE DISCLOSURE

In one exemplary aspect, the present disclosure is directed to a system. The system includes a control module, comprising computer-executable code stored in non-volatile memory, a processor, a control center device, and a plurality of autonomous devices that operate remotely from the control center device, each of the plurality of autonomous devices including a control device. The control module, the processor, the control center device, and the control devices are configured to collect data using one or more collection devices disposed at each of the plurality of autonomous devices, process the collected data using the control devices disposed at the plurality of autonomous devices, transfer the processed data from the control devices to the control center device when the plurality of autonomous devices are autonomously operating without control by the control center device, train artificial intelligence as a function of the processed data transferred from the control devices, determine an incident risk level of the plurality of autonomous devices operating without control by the control center device based on the artificial intelligence, and take control of at least one of the plurality of autonomous devices based on the incident risk level.

In another aspect, the present disclosure is directed to a method. The method includes providing a control center device, providing a plurality of autonomous devices that operate remotely from the control center device, each of the plurality of autonomous devices including a control device, collecting data using one or more collection devices disposed at each of the plurality of autonomous devices, processing the collected data using the control devices disposed at the plurality of autonomous devices, and transferring the processed data from the control devices to the control center device when the plurality of autonomous devices are autonomously operating without control by the control center device. The method also includes training artificial intelligence as a function of the processed data transferred from the control devices, determining an incident risk level of the plurality of autonomous devices operating without control by the control center device based on the artificial intelligence, and taking control of at least one of the plurality of autonomous devices based on the incident risk level.

As described in detail herein below, are exemplary embodiments of autonomous units (vehicles, terrestrial or aerial drones, or robots) methods systems and autonomous unit's embedded systems for remote control and monitoring.

In at least some exemplary embodiments, a generic smart remote monitor and control device (G-SRMCD) may be provided comprising at least one processing device and installed in the autonomous unit, the G-SRMCD programmed and configured to receive data from various sensors in an autonomous vehicle, robot or drone; determine the incident risk level (IRL) to inform the Remote Monitor and Control Center (RMCC) in electronic communication if the autonomous unit will be provided assistance (e.g., and an agent in the RMCC can take control at any time of the autonomous vehicle, robot or drone). For example, the G-SRMCD may transfer control to the RMCC.

In another embodiment, the G-SRMCD may be programmed and configured further to contact an emergency responder in the event of an accident with the autonomous vehicle, robot, or drone.

In another embodiment, the G-SRMCD may be programmed and configured further to predict remote assistance using the installed cameras in the autonomous vehicle, robot, or drone in combination with artificial intelligence methods.

In another embodiment, the G-SRMCD may be programmed and configured further to detect deadlock situations where the autonomous vehicle, robot or drone cannot move and request assistance to the RMCC.

In another embodiment, the G-SRMCD may be programmed and configured further to detect and predict problems while driving the autonomous vehicle, robot or drone and display a report to the remote operator while remotely operating the autonomous unit.

In another embodiment, the G-SRMCD may be programmed and configured further to detect and report incidents to the RMCC.

In another embodiment, the G-SRMCD may be programmed and configured further to transmit video streams from multiple camera or other sensors installed in the autonomous vehicle, robot or drone, to an RMCC-based workstation if and when commanded by an operator at the RMCC.

In another embodiment, the G-SRMCD may be programmed and configured further to monitor the autonomous vehicle, robot or drone alarm and monitoring systems. In autonomous vehicles, the G-SRMCD can obtain data from multiple devices such as electronic control units (ECUs) or advanced driver-assistance systems (ADAS).

In another embodiment, the G-SRMCD may be programmed and configured further to report alarms to the RMCC based on the received data from various sensors in the autonomous vehicle, robot, or drone.

In another embodiment, the G-SRMCD may be programmed and configured further to establish and maintain a persistent communications channel (through a mobile data network virtual circuit using secure, encrypted TCP-based network protocols Transport Layer Security "TLS" or secure Web socket "WSS") to a server based at the RMCC or some other fixed location.

In another embodiment, the G-SRMCD may be programmed and configured further to authenticate itself by presenting stored credentials and to register its existence, location, and status to the remote server and to the RMCC.

In another embodiment, the G-SRMCD may be programmed and configured further to handle a redundant wireless data link connection to the RMCC.

In another embodiment, the G-SRMCD may be programmed and configured further to report the RMCC the GPS autonomous vehicle, robot, or drone location.

In another embodiment, the G-SRMCD may be programmed and configured further to remotely control and drive the autonomous vehicle, robot, or drone from the RMCC.

In another embodiment, the G-SRMCD may be programmed and configured further to support multiple vehicles, robot, or drone control protocols such as the drive-by-wire protocol.

In another embodiment, the G-SRMCD may be programmed and configured further to obtain the temperature and humidity levels in the autonomous vehicle, robot, or drone cabin. This information may help to determine if the G-SRMCD is in operational conditions and if passengers (if any) are in a comfortable environment.

In another embodiment, the G-SRMCD may be programmed and configured further to send and receive SMS via SMPP or other protocols. The G-SRMCD can notify a configurable list of administrators if the G-SRMCD loses connection to the RMCC or detected other issues. The SMS communication can allow administrators to request the G-SRMCD specific data or status and operational reports.

In another embodiment, the G-SRMCD may be programmed and configured further to support 4G LTE, private wireless or 5G modems and antennas for wireless data connectivity to the RMCC. In at least some exemplary embodiments, transferring processed data from control devices (e.g., G-SRMCD) to the control center device (e.g., RMCC) may include transferring a high bandwidth audio and video streams via either a commercial public or a private mobile data network using either LTE or 5G cellular network standards (with the goal of ensuring the lowest possible latency for the arrival of the video frames at the RMCC monitoring workstation).

In another embodiment, the G-SRMCD may be programmed and configured further to detect if the connection to the RMCC is lost and based on the incident risk level, the G-SRMCD may indicate the autonomous unit either to continue or safely park until the connection to the RMCC is reestablished.

In another embodiment, the G-SRMCD may be programmed and configured further to detect wireless network weak signals and suggest the RMCC to avoid that area and reroute the autonomous unit.

In another embodiment, the G-SRMCD may be programmed and configured further to forward any autonomous vehicle, robot or drone driving user warning message or alert to the remote operator. Those alerts may include the detection of pedestrian on the read, the autonomous unit is exceeding the speed limit, a vehicle ahead suddenly stopped, and/or any other suitable conditions.

In another embodiment, the G-SRMCD may be programmed and configured further to disable the autonomous mode in the vehicle, robot or drone and engage the RMCC agent to control the autonomous unit.

In another embodiment, the G-SRMCD may be programmed and configured further to secure and encrypt the captured data in the autonomous vehicle, robot, or drone and as well any data communication with the RMCC.

In another embodiment, the G-SRMCD may be programmed and configured further to send the RMCC sensor data in the autonomous vehicle, robot or drone and the results of various computer vision algorithms to calculate and update the incident risk level (IRL).

In another embodiment, the G-SRMCD may be programmed and configured further to verify if software updates are available and install them when the autonomous unit is not in operation. Also, the G-SRMCD can receive push notifications to either send or receive data and software updates.

In another embodiment, the G-SRMCD may be programmed and configured further to collect data, video and audio for data analytics and artificial intelligence models training purposes.

In another embodiment, the G-SRMCD may be programmed and configured further to monitor the autonomous vehicle, robot, or drone performance on the road, collect and analyze the data to predict when the autonomous unit will be provided remote assistance. The same information may be shared with the autonomous unit manufacturer for their review.

In another embodiment, the G-SRMCD may be programmed and configured further to read the speed limit signs using the G-SRMCD sensors or the autonomous vehicle, robot, or drone sensors, and detect school zone flashing lights to monitor the autonomous unit speed, and inform the RMCC if the autonomous unit is not respecting the speed limit and request remote control.

In another embodiment, the G-SRMCD may be programmed and configured further to record conditions when an in-vehicle driver takes control over the autonomous mode of the autonomous vehicle. This information may be valuable for autonomous vehicle makers to fine tune their artificial intelligence algorithms.

In another embodiment, the G-SRMCD may be programmed and configured further to integrate the autonomous vehicle, robot or drone artificial intelligence algorithms data. The data aggregation may assist the G-SRMCD to update the incident risk level and notify the RMCC if the autonomous unit is requesting or might need assistance.

In another embodiment, the G-SRMCD may be programmed and configured further to contain a user interface for the vehicle passengers (if any) capable to provide audio and video to the RMCC.

In another embodiment, the G-SRMCD may be programmed and configured further to provide a panic or emergency button for the autonomous vehicle passengers and connect the G-SRMCD to an agent in the RMCC.

In another embodiment, the G-SRMCD may be programmed and configured further to assist the autonomous vehicle, robot, or drone when the unit arrived a gated community. It might be appropriate to have the RMCC agent to talk to the gate guard or automated kiosk, display an entry code, etc.

In another embodiment, the G-SRMCD may be programmed and configured further to detect if the autonomous vehicle, robot, or drone is out of the autonomous unit's operation map. In this scenario, the remote operator in the RMCC could control and drive the autonomous unit.

In another embodiment, the G-SRMCD may be programmed and configured further to notify the RMCC if the autonomous unit is 100 meters away from the destination. This is in case the autonomous unit needs assistance in the case of doing a delivery or needs to drive away from the street.

BRIEF DESCRIPTION OF THE DRAWINGS

Accompanying this written specification is a collection of drawings of exemplary embodiments of the present disclosure. One of ordinary skill in the art would appreciate that these are merely exemplary embodiments, and additional and alternative embodiments may exist and still within the spirit of the disclosure as described herein.

DETAILED DESCRIPTION AND INDUSTRIAL APPLICABILITY

Figure 1:
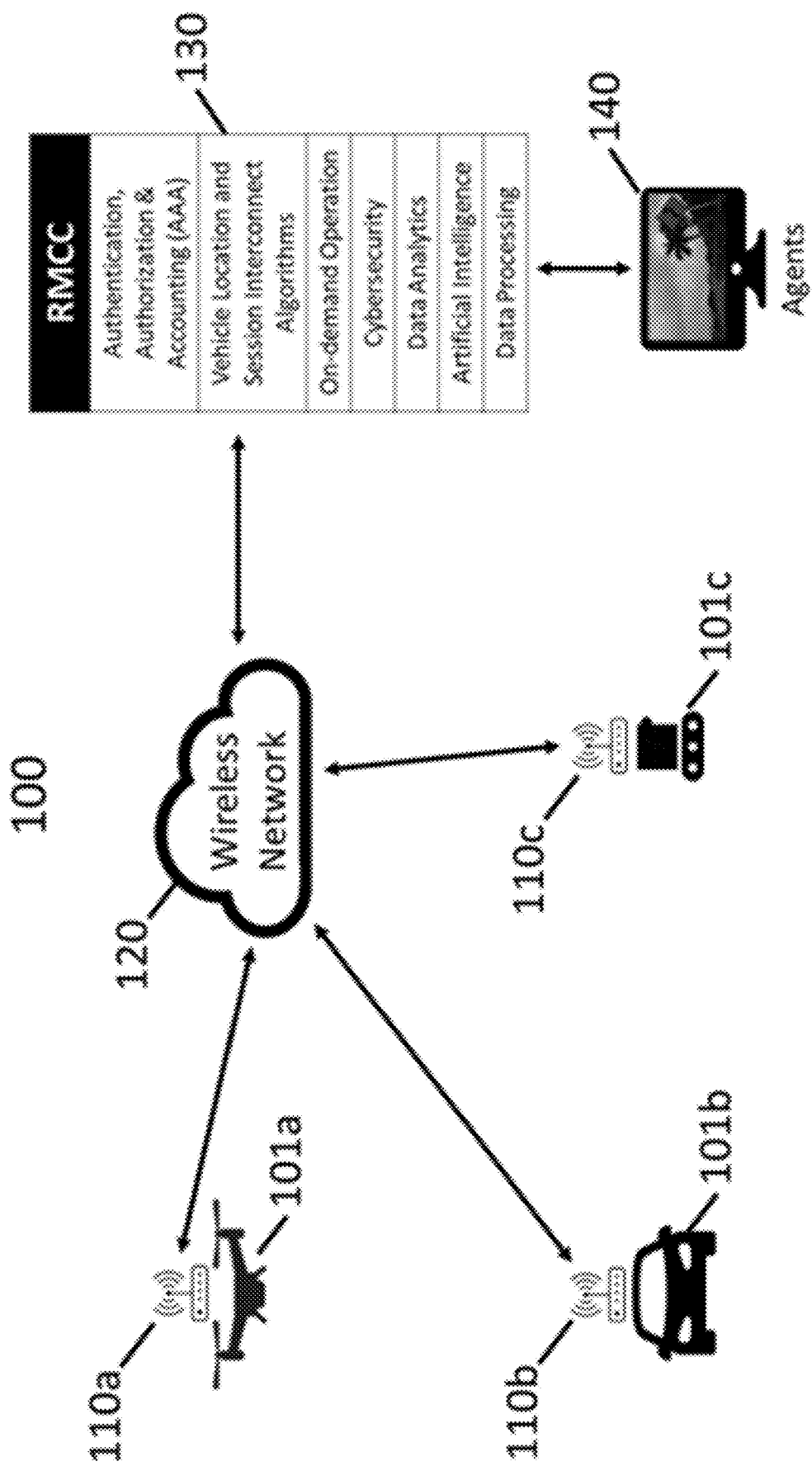
FIG. 1 is a graphical representation of several exemplary disclosed artificial intelligence (AI) autonomous units internetworked with an exemplary disclosed remote monitoring and control center (RMCC) system and an exemplary disclosed remote control agent workstation. The RMCC and agent workstation that may be configured to supervise the operating safety of independently governed autonomous units, take control of the autonomous units to restore safe operation in response to unsafe operation recognized by the RMCC, and in response to determining safe autonomous unit operation has been restored, return control to the autonomous units. The RMCC includes components, such as authentication/authorization/accounting (AAA), vehicle location and session interconnect algorithms, data analytics tools, cyber security software, data processing capabilities and an advanced artificial intelligence (AI) software layer for an on-demand operation.

In at least some exemplary embodiments, the exemplary disclosed system may be a Generic Smart Remote Monitor and Control Device (G-SRMCD) for an Autonomous Vehicle, Robot or Drone. The exemplary disclosed system and method may provide remote control of an autonomous vehicle, robot, or drones. In at least some exemplary embodiments, the exemplary disclosed system and method may provide a device that may be placed in the autonomous vehicle, robot, or drone to remotely monitor and control the unit in the event the unit is to receive remote assistance.

Disclosed herein are various embodiments related to remote monitoring and control of independently operating autonomous vehicles, drones and robots based on artificial intelligence, visual sensor fusion, and data sharing, between the autonomous units and a monitoring and control center remote from the autonomous units, for improved safety. Reference will now be made in detail to the description of exemplary embodiments as illustrated in the drawings, wherein like reference numbers indicate like parts throughout the several views.

The exemplary disclosed autonomous unit may provide features such as pedestrian detection and avoidance that may offer convenience and safety to the user of the vehicle and people located around the autonomous unit. An AI system for the exemplary disclosed autonomous unit may include current mobile technology, machine learning, deep networks, and/or neural networks that may allow the vehicle to navigate to its destination. While the exemplary disclosed autonomous unit is operating under AI control, the AI system can recognize when a collision with an object such as, e.g., a human, an animal, another car, object, or any combination thereof is probable or likely due to unforeseen situations. In response to such a determination, evasive actions may be initiated to intelligently avoid the collision. This system can be implemented as a "plug in and play" item or via a retrofit or it can be built into a new unit. This system can be extended to park an autonomous unit and can also be used by the user to navigate to a destination whether or not the user is aboard the vehicle and the vehicle will be able to do so with little or substantially no help from the user. For certain autonomous units there may not be any passengers or drivers, as they may be limited to package delivery and other utilitarian services.

FIG. 1 illustrates a graphical representation of various elements included in the exemplary disclosed AI system. For example, the AI system 100 may include autonomous vehicles, drones, and robots 101a, 101b, and 101c, and a control component such as a remote monitoring and control center (RMCC) 130, which may include processing circuitry and application software implementing various features of the AI system. In the illustrated example, the RMCC 130 may include data analytics and AI software modules integrated with cybersecurity and data processing implementations providing on-demand operation for AI-based autonomous unit remote monitoring and control services. The exemplary embodiment of FIG. 1 illustrates three autonomous units 101a, 101b, and 101c. Also for example, an embodiment AI system 100 and RMCC 130 may remotely monitor and control a greater number of similar autonomous units. In at least some exemplary embodiments, the processing circuitry may be implemented as at least a portion of a microprocessor. The processing circuitry may be implemented using one or more circuits, one or more microprocessors, microcontrollers, application specific integrated circuits, dedicated hardware, digital signal processors, microcomputers, central processing units, field programmable gate arrays, programmable logic devices, state machines, super computers, or any combination thereof. In yet other embodiments, the processing circuitry may include one or more software modules executable within one or more processing circuits. The processing circuitry may further include memory configured to store instructions and/or code that causes the processing circuitry to execute data communication functions.

The units 101a, 101b, and 101c, may include devices 110a, 110b, and 110c respectively installed in the autonomous unit to communicate via a wireless network 120 such as, e.g., a wireless local area network (WLAN), private network and/or cellular network. The devices 110a, 110b, and 110c can include processing circuitry (e.g., a transmitter, receiver, and/or transceiver) to support the wireless communications. For example, the devices 110a, 110b, and 110c may support cellular communications such as, e.g., a cellular data connection such as third generation (3G), fourth generation (4G), long term evolution (LTE), fifth generation (5G), or other data communication standard. The units 101a, 101b, and 101c, and/or devices 110a, 110b, and 110c may support wireless communications such as, e.g., IEEE 802.11a/b/g/n and Wi-Fi 6, also known as 802.11ax. Processing circuitry of the units 101a, 101b, and 101c, and devices 110a, 110b, and 110c can also support GPS capabilities to determine their geographical location. The AI system 100 can use applications that are independent of the remote operator device platform or operating system (e.g., Android, iOS, Linux, webOS, Windows, etc.) and/or the unit type, make, model, and manufacturer. Communication with the RMCC 130 can be carried out via a network 120 (e.g., the Internet, private network, VPN, etc.) that is communicatively coupled to the wireless network 120. The RMCC 130 may be implemented as, e.g., a web service on a processing system such as one or more servers. Such web services can be used from a private or public data center. The RMCC 130 may employ data fusion techniques to combine data accessible from the sensors in the units 101a, 101b, and 101c and devices 110a, 110b, and 110c into composite data, and the RMCC may base decisions on AI-based learning from the composite data thus formed.

Intelligent incident avoidance can identify objects that are potentially in the path of each of the autonomous units 101a, 101b, and 101c, thereby allowing the units 101a, 101b, and 101c to minimize potential injury and/or damage. Intelligent incident reporting can keep a remote operator informed through the RMCC 130 of when any of the units 101a, 101b, or 101c are, e.g., touched, broken into, and/or hit by another vehicle. When an incident is detected, cameras in 101a, 101b, 101c or 110a, 110b, and 110c may take pictures of its surroundings and/or record audio and/or video around the time of detection.

Remote cabin control can allow the remote-control operator 140 to control settings and/or determine conditions of the units 101a, 101b, and 101c. For example, the remote-control operator may be able to remotely operate windows, sun/moon roof, doors, trunk, side door mirrors, lights (e.g., cabin lights, exterior head lights, etc.), seat position and/or temperature, interior climate controls (e.g., air conditioning, heat, defogger and/or other model specific settings such as humidity), media devices (e.g., standard and/or SiriusXM radio, compact disc player, DVD player), and/or remotely start any unit 101a, 101b, or 101c. Control and/or status information may be communicated directly between the unit 101a, 101b, or 101c and remote-control operator via the wireless network 120 and/or through the RMCC 130, which may store predefined control settings for each unit 101a, 101b, and 101c.

The G-SRMCD 110a, 110b and 110c also supports a smart incident prediction system (SIPS). An incident can include a collision or other disruption or damage to the autonomous unit 101a, 101b or 101c. The incident prediction system may be a computer vision model in combination with artificial intelligence methods that is used to determine if the autonomous unit is about to collide with a human, animal or other object that might damage the unit 101a, 101b or 101c. The system may notify the possible incident event to the remote operation controller with a sound and visual alarm if the autonomous unit is remotely controlled, otherwise it may instruct the unit to stop immediately and notify the incident to the RMCC.

The smart incident prediction system may also detect road conditions or traffic situations where the autonomous unit historically has shown to have difficulties, or the unit could get damaged. Those road conditions and traffic situations may include, for example, portable barriers, barricades, policemen directing the traffic, a flooded street, open manholes, potholes, road covered with snow, ambulance or police car blocking a street, a car accident, people blocking the street, a tree or pole that fell on the street, etc. In at least some exemplary embodiments, the system notifies the possible incident event to the remote operation controller with a sound and visual alarm if the autonomous unit is remotely controlled, and otherwise it may instruct the unit to stop immediately and notify the incident to the RMCC.

The incident prediction system may make use of sensory data from sensors in the G-SRMCDs 110*a*, 110*b*, and 110*c*. It also may use the sensor data in the autonomous units 101*a*, 101*b*, and 101*c*, including for example cameras, ultrasonic sensors, line following sensors, and thermal sensors to achieve its goals. Other sensors that may be used include, for example, laser range finders and other distance sensors, lidar, stereo cameras, audio sensors, gyrometer, infrared sensors, photosensitive sensors, GPS units, tracking systems, and/or any other suitable system. After collecting data from the sensors, the incident prediction system may employ artificial intelligence techniques such as neural networks, and/or deep convolutional neural networks to recognize objects, and then to determine whether to stop the autonomous unit and alert the event to the RMCC. In at least some exemplary embodiments, the data collected from the autonomous units 101*a*, 101*b*, and 101*c* and sensors 110*a*, 110*b*, and 110*c* may be sent to the RMCC 130 to be processed by the RMCC 130. In some scenarios, the smart incident prediction system can be implemented by processing circuitry of the G-SRMCD 110*a*, 110*b*, or 110*c* (e.g., computer systems, super computers, microcontrollers, microprocessors, graphics processing units (GPUs) and/or external memory). In various instances, the smart incident prediction system can also be implemented by processing circuitry of the RMCC 130 (e.g., computer systems, super computers, microcontrollers, microprocessors, GPUs, and/or external memory).

Photosensitive sensors may be used for lane detection while thermal sensors can be used to give thermal readings for objects in the unit's path including for example pedestrians, animals, ice and standing water. The smart incident prediction system may also use ultrasonic sensors, cameras, and laser range finders, using their ability to ascertain distance information, for object avoidance. The incident avoidance system is dependent on the vehicle's ability to properly detect objects, road signs, traffic lights and other bodies. As a result, an independent vision system can be used by the G-SRMCDs 110*a*, 110*b*, and 110*c* to detect and avoid hazards and incidents involving fixed or mobile animate or inanimate objects. Data from the vision system may be used to collect stereovision quality picture data that can be fed to processing circuitry such as, e.g., a microcontroller, microprocessors, or GPUs for processing. The vision system may include, for example, stereo cameras, infrared cameras, microcontrollers, microprocessors, GPUs, and connective components. Positional data to keep track of the vehicles 101*a*, 101*b*, and 101*c* at various locations may also be gathered. GPS units in the vehicles 101*a*, 101*b*, and 101*c*, and in an emergency, may be used to retrieve positional data.

Deep neural networks may be employed in object recognition. Deep neural networks may utilize computational methods that have been derived to mimic the brain, using highly interconnected processing elements, which give them learning capabilities and enable them to recognize and understand subtle or complex patterns. A neural network may include a mathematical model that resembles a biological network in structure and functionality. It is an adaptive system that allows the network to change its structure based on data transmitted through it during its learning phase. After the network learns during the learning phase, it can then be used to predict future outcomes when fed with relevant data.

In at least some exemplary embodiments, the exemplary disclosed system may utilize sophisticated machine learning and/or artificial intelligence techniques to prepare and submit datasets and variables to cloud computing clusters and/or other analytical tools (e.g., predictive analytical tools) which may analyze such data using artificial intelligence neural networks. The exemplary disclosed system may for example include cloud computing clusters performing predictive analysis. For example, the exemplary neural network may include a plurality of input nodes that may be interconnected and/or networked with a plurality of additional and/or other processing nodes to determine a predicted result. Exemplary artificial intelligence processes may include filtering and processing datasets, processing to simplify datasets by statistically eliminating irrelevant, invariant or superfluous variables or creating new variables which are an amalgamation of a set of underlying variables, and/or processing for splitting datasets into train, test and validate datasets using at least a stratified sampling technique. The exemplary disclosed system may utilize prediction algorithms and approach that may include regression models, tree-based approaches, logistic regression, Bayesian methods, deep-learning and neural networks both as a stand-alone and on an ensemble basis, and final prediction may be based on the model/structure which delivers the highest degree of accuracy and stability as judged by implementation against the test and validate datasets.

Deep neural networks can be employed by smart incident prediction system to identify human objects based upon, e.g., their different shapes, different body structures, different postures, different poses, different light intensities, different ethnicity, different activities, different movement and/or velocities in the area of the vehicle, and/or different locations in the road. Non-human living objects such as animals may be identified based upon, e.g., their different shapes, different body structures, different colors, different activities, and/or different movement and/or velocities in the area of the vehicle. Combinations of humans and animals may also be identified based upon, e.g., their different shapes, different body structures, different colors, different activities, and/or different movement and/or velocities in the area of the vehicle. Based on the deep neural network learning the above properties of both animate and inanimate objects in the vicinity of the vehicle, the smart incident prediction system can tailor a response to the identification.

The RMCC 130 also suggests route alternatives to avoid crime and/or vandalism reported areas to decrease the incident risk level. The G-SRMCDs 110*a*, 110*b* and 110*c* can receive the request and push it to the autonomous vehicle to take an alternative route to reach the planned destination. The RMCC based on artificial intelligence methods will learn to avoid areas where crimes and vandalism were reported, or to avoid areas with reported problems in progress, such as, a fire in progress, a flooded street, a blocked street by police, a march or a protest in progress, etc. Frequently safe travelled paths may be learned by the system.

The remote-control operator can request via the G-SRMCDs 110*a*, 110*b* and 110*c* to enable manual operation of autonomous units 101*a*, 101*b*, and 101*c* in the event, for example, autonomous operation is disabled or unsafe, following an incident, such as an accident.

Figure 2:
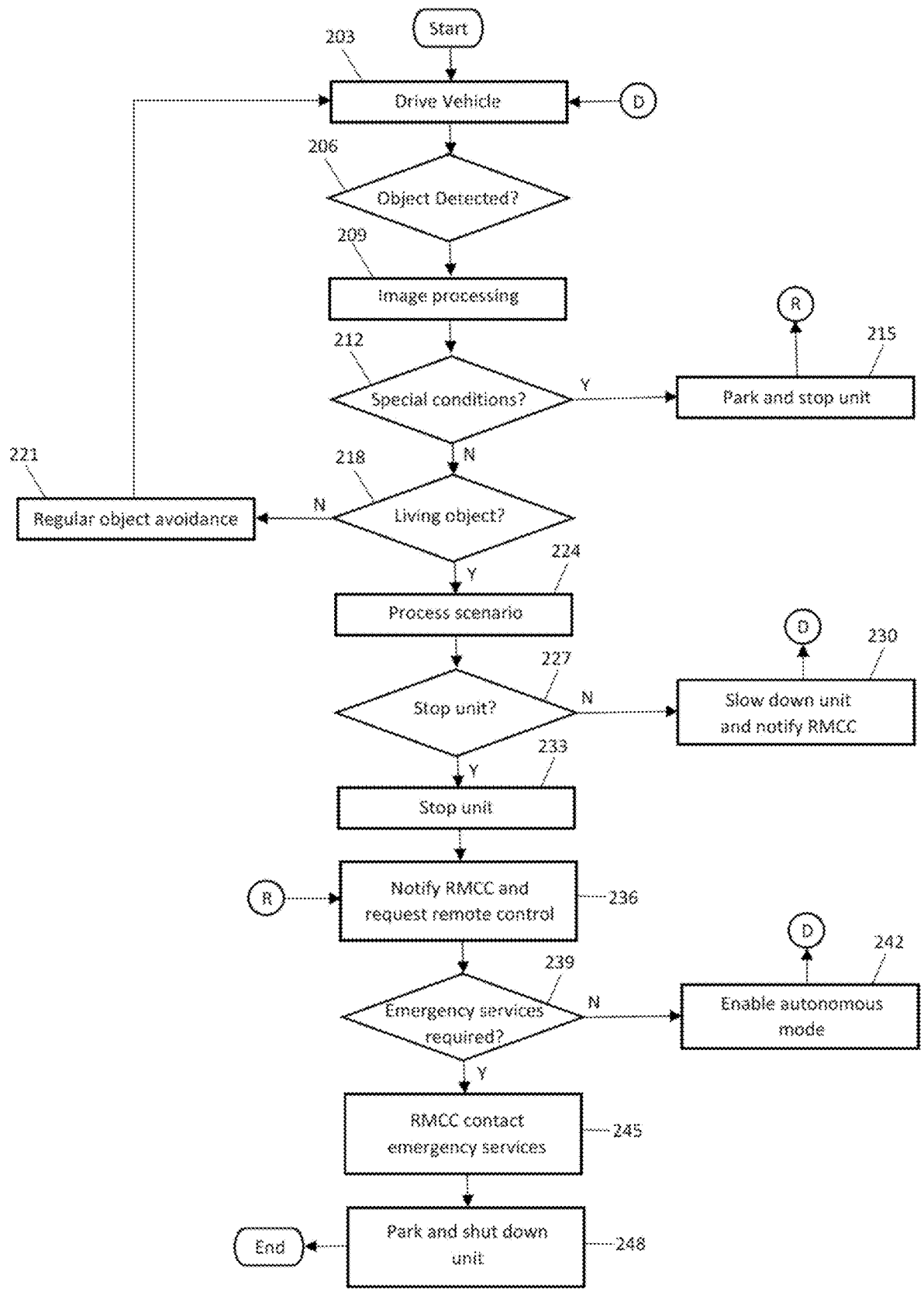
FIG. 2 is a flowchart illustrating an example of an incident avoidance system that can be implemented in the system of FIG. 1 in accordance with various embodiments of the present disclosure.

FIG. 2 depicts a flowchart illustrating an example of the smart incident prevention system that can be implemented in G-SRMCDs 110*a*, 110*b* and 110*c*, and implemented in the RMCC 130, in the AI system 100 (FIG. 1). Beginning with 203, the smart incident prevention system is active while the autonomous unit is autonomously driving. Processing circuitry of the RMCC 130 and the autonomous units 101*a*,

101b, and 101c monitor sensors, the G-SRMCDs 110a, 110b and 110c monitor sensors installed in the vehicles 101a, 101b, and 101c to determine whether an object is detected in 206. If an object is detected in the path of any of the autonomous units 101a, 101b, or 101c, or may enter the path of any autonomous unit 101a, 101b, or 101c, a vision system processes one or more images in 209 to determine if it is a living object. The vision system also recognizes traffic or road conditions, and depending on the severity, the G-SRMCDs 110a, 110b and 110c report to the RMCC 130 if remote assistance is appropriate in 212. If assistance is to be provided, the autonomous unit is safely parked and stopped in 215. Then the G-SRMCDs 110a, 110b and 110c will notify RMCC 130 of the incident and request for remote control in 233. If the detected object is not a living object in 218, then the vehicle 101a, 101b, or 101c can operate with available object avoidance algorithms in 221 before continuing operation in 203.

If it is determined in 218 that a living object has been detected, then the smart incident avoidance system processes the scenario in 224 to determine if the vehicle 101a, 101b, or 101c should slow down or immediately stop the autonomous unit. If it is determined in 224 that a collision can be avoided by slowing down, then in 227 the unit 101a, 101b, or 101b that can avoid a collision, is directed to slow down or maneuver away from object in 230 before returning to 203. If an immediate stop is appropriate to avoid collision, in 233 the autonomous unit is stopped. The smart incident prevention system can notify the RMCC 130 and request remote control in 236 and determine if the vehicle 101a, 101b, or 101c can safely continue autonomously or if emergency services are to be provided at the autonomous unit location. If an accident is detected in 239, the appropriate emergency services are contacted in 245. After reporting the incident to the emergency services, the autonomous unit 101a, 101b, or 101c is safely parked and shut down by the remote-control operator in 248. If there is no accident, the autonomous mode is enabled in the autonomous unit 101a, 101b, or 101c in 242 to return to 203. In some implementations, the vehicle 101a, 101b, or 101c may be parked in 233 without notifying the RMCC in 236 if no injury has occurred. If the vehicle cannot be safely parked in 248, the vehicle can be shut down until emergency personnel arrive or the vehicle 101a, 101b, or 101c can be safely moved manually by a driver, passenger, or by an emergency responder.

The AI system 100 may also support a smart incident reporting system (SIRS). The smart incident reporting system may detect whether, while the autonomous unit is parked or idling or even in motion, an external entity tampered with the body or other portion of the autonomous unit 101a, 101b, or 101c (e.g., as illustrated in FIG. 1). Using audio and visual sensors, the smart incident reporting system can record parties involved with the contact and an incident report may be sent to the user or owner informing him or her of possible damage to the autonomous unit. It also can provide assessments of the number of vehicles, passengers, and pedestrians, animals and objects involved and the nature of the injuries and damages to them.

Activities that can activate the smart incident reporting system include, for example, other vehicles or objects hitting any part of the autonomous units 101a, 101b, or 101c, humans and/or animals touching and/or damaging the autonomous units 101a, 101b, or 101c, vandalism to the autonomous units 101a, 101b, or 101c, theft of any of the autonomous units 101a, 101b, or 101c, and/or foreign objects falling on any of the autonomous units 101a, 101b, or 101c. Sensors can include cameras (mono and/or stereo), laser range finders, lidar, gyrometer, infrared sensors, thermal sensors, image sensors, etc. Processing circuitry (e.g., a computer or other processing device) in the G-SRMCDs 110a, 110b, and 110c may control and monitor the sensors.

When an incident is detected, data may be collected from the sensors and the smart incident reporting system determines what type of activity is happening around the unit by assessing the data. The smart incident reporting system may inform the remote-control monitor of the type of activity (e.g., when a vehicle is touched, being broken into, and/or hit by another car) through the RMCC 130. The remote control monitor may then view data from the vision, sound and thermal sensors to determine whether to call the authorities, press the panic button for the autonomous unit 101a, 101b, or 101c, or do nothing, or any combination of those responses. The smart incident reporting system may be configured to automatically contact authorities about the incident when approved by the RMCC 130. The RMCC administrator can define which activities want to be informed about, or to inform as well to other people managing the autonomous units. For instance, reports may include report burglary attempts, foreign object interference with the vehicle, situations in which another car hits the vehicle, or any combination thereof.

When an incident is detected, either by the RMCC 130 or any of the G-SRMCDs 110a, 110b and 110c, the vision systems of the involved autonomous unit 101a, 101b, or 101c and G-SRMCDs 110a, 110b and 110c may be directed to take pictures and/or video recordings of surroundings and the audio system records sounds made around the time of detection or interference. The data collected from detection of the incident can be recorded, analyzed, and used to generate an incident report. This report may be sent to the remote-control operator interface 140. The incident report can contain screen shots and/or video of the incident with probable perpetrators along with any audio that was recorded using an installed microphone during the incident. The incident report also can be sent to an emergency responder electronic report platform.

Figure 3:
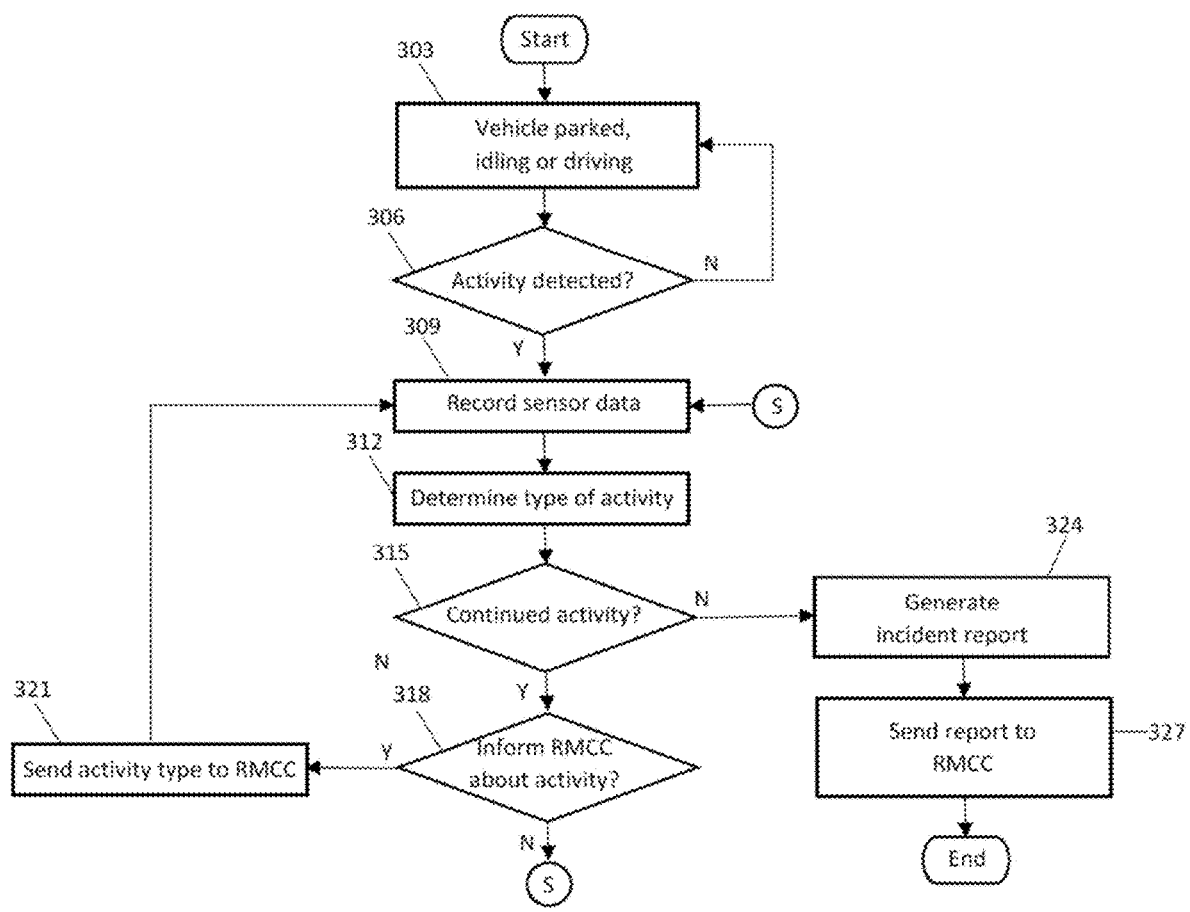
FIG. 3 is a flowchart illustrating an example of an incident reporting system that can be implemented in the AI system of FIG. 1 in accordance with various embodiments of the present disclosure.

FIG. 3 depicts a flowchart illustrating an example of the smart incident reporting system that can be implemented in the autonomous units 101a, 101b, and 101c, and the G-SRMCDs 110a, 110b and 110c and the RMCC 130 of the AI system 100 (FIG. 1). Beginning with 303, the smart incident reporting system is active while the unit is in a parked position, stationary, driving or idling. The G-SRMCDs 110a, 110b and 110c may detect movement of any of the autonomous units 101a, 101b, or 101c or an impulse caused by an impact with any of the autonomous units 101a, 101b, or 101c. If an activity or incident is detected in 306, the smart incident reporting system then begins recording the sensor data in 309. The sensor data may be recorded for a predefined interval such as, e.g., one minute or any other desired interval.

The type of activity is determined by the accident reporting system in 312 based upon the recorded data and other indications from the autonomous unit systems. For example, the video images may be used to identify whether the accident is caused by an individual, animal, another vehicle, or other object. Characteristics of the movement and/or impact may also be used to determine the type of accident. If the activity continues in 315, the smart incident reporting system determines if the RMCC is to be informed about the identified activity type in 318 by viewing the autonomous unit's predefined preferences. If so, then the smart incident reporting system notifies the RMCC 130 of the activity type by sending a notification in 321. The smart incident reporting system continues recording the sensor data in 309. If the activity has stopped in 315, an incident report is generated in 324, which is sent to the RMCC via the remote-controller operator interface 140 in 327 or via email, SMS, or a privately accessed web application. The format of the incident report may be predefined by the RMCC and may include at least a portion of the recorded sensor data.

Figure 4:
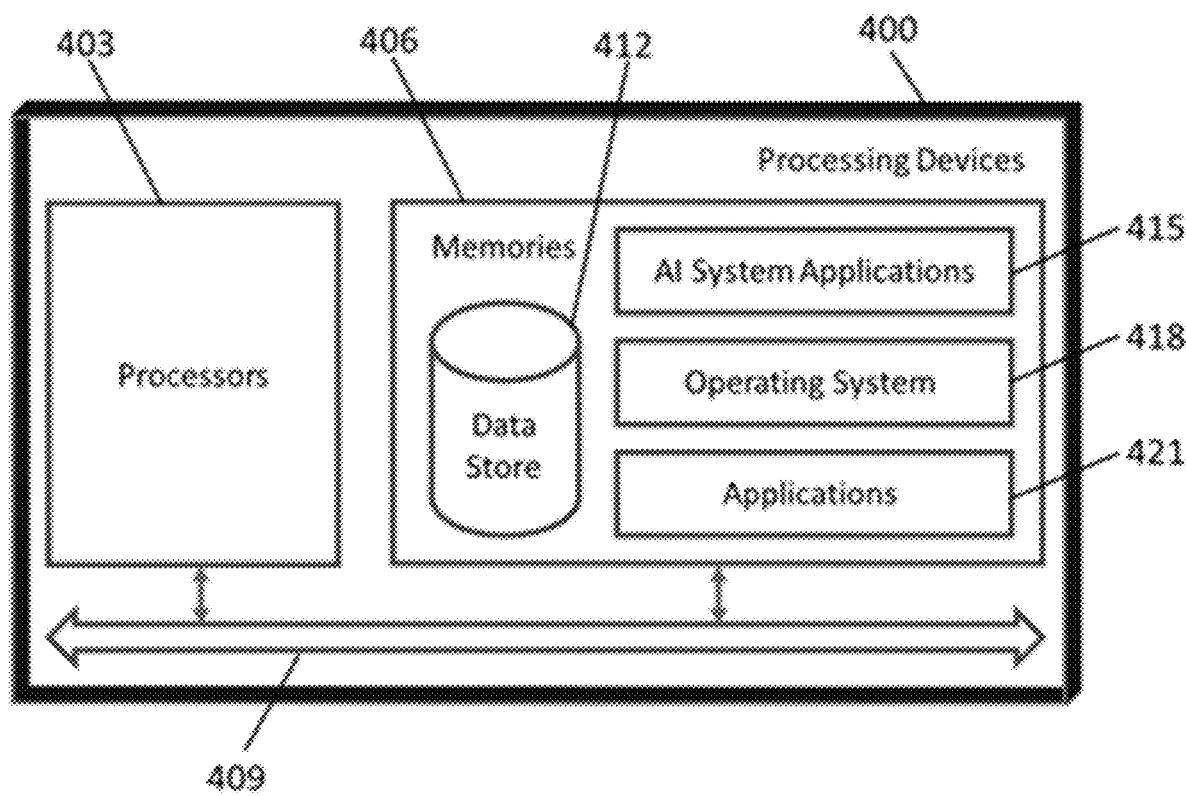
FIG. 4 is a flowchart illustrating an example of a system and method for handoff of control of an autonomous vehicle to an emergency responder or human driver in the event of an incident, that can be implemented in the AI system of FIG. 1.

FIG. 4 illustrates a schematic block diagram of an exemplary processing device 400 that may be used to implement various portions of the AI system 100 of FIG. 1 in accordance with various embodiments of the present disclosure. The processing device 400 may include, e.g., a computer and/or microprocessor included in any of the vehicles 101a, 101b, and 101c, the G-SRMCDs 110a, 110b and 110c, remote-control operators interfaces 140 and/or server(s) supporting the RMCC 130 (as illustrated in FIG. 1). The processing device 400 may include multiple processor circuits, for example, having processors 403, memory 406, and data store 412, which are coupled to a local interface 409. To this end, the processing device 400 may comprise processing circuitry such as, for example, at least one computer, server, cloud server, IoT device, embedded system, electronic control unit (ECU), smart phone, or like device. The local interface 409 may comprise, for example, a data bus with an accompanying address/control bus or other suitable bus structure. The processing device 400 can include a display for rendering of generated graphics such as, e.g., a user interface and an input interface such, e.g., a keypad or touch screen to allow for user input. In addition, the processing device 400 can include communication interfaces (not shown) that allow the processing device 400 to communicatively couple with other devices such as, e.g., communication interfaces included in any of the vehicles 101a, 101b, and 101c, and/or devices supporting the RMCC 130. The communication interfaces may include one or more wireless connection(s) such as, e.g., Bluetooth or other radio frequency (RF) connection and/or one or more wired connection(s).

Stored in the memory 406 may be both data and several components that are executable by the processors 403. In particular, stored in the memory 406 and executable by the processors 403 may be AI system application(s) 415, an operating system 418, and/or other applications 421. AI system applications 415 can include applications based on artificial intelligence and machine learning techniques that support autonomous unit operation, monitoring, and control, e.g., autonomous passenger retrieval, autonomous parking, intelligent collision avoidance, intelligent accident reporting, gradual intelligent route learning, remote cabin control, simultaneous multiple autonomous vehicle visual sensor fusion, simultaneous multiple autonomous unit monitoring, simultaneous multiple autonomous vehicle control, and/or distributed information sharing. There may also be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, Matlab, or other programming languages and their libraries.

A number of software components may be stored in the memory 406 and are executable by the processors 403. Being "executable" may include a program file that is in a form that can ultimately be run by the processors 403. Examples of executable programs may be, for example, a compiled program that can be translated into machine code in a format that can be loaded into a random access portion of the memory 406 and run by the processors 403, source code that may be expressed in proper format such as object code that is capable of being loaded into a random access portion of the memory 406 and executed by the processors 403, or source code that may be interpreted by another executable program to generate instructions in a random access portion of the memory 406 to be executed by the processors 403, or any other suitable program. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 may include both volatile and nonvolatile memory and data storage components. Volatile components may include those that do not retain data values upon loss of power. Nonvolatile components may include those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the memory 406 may represent multiple memories 406 that may operate in parallel processing circuits. In such a case, the local interface 409 may be an appropriate network that facilitates communication between any two of the multiple processors 403, between any processors 403 and any of the memories 406, between any two of the memories 406, or any other suitable configuration. The local interface 409 may comprise additional systems designed to coordinate this communication, including, for example, performing load balancing. The processors 403 may be of electrical or of some other available construction.

Although the AI system application(s) 415, the operating system 418, application(s) 421, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, for example, discrete logic circuits having logic gates for implementing various logic functions upon an application of one or more data signals, application specific integrated circuits having appropriate logic gates, or other suitable components.

Figure 5:
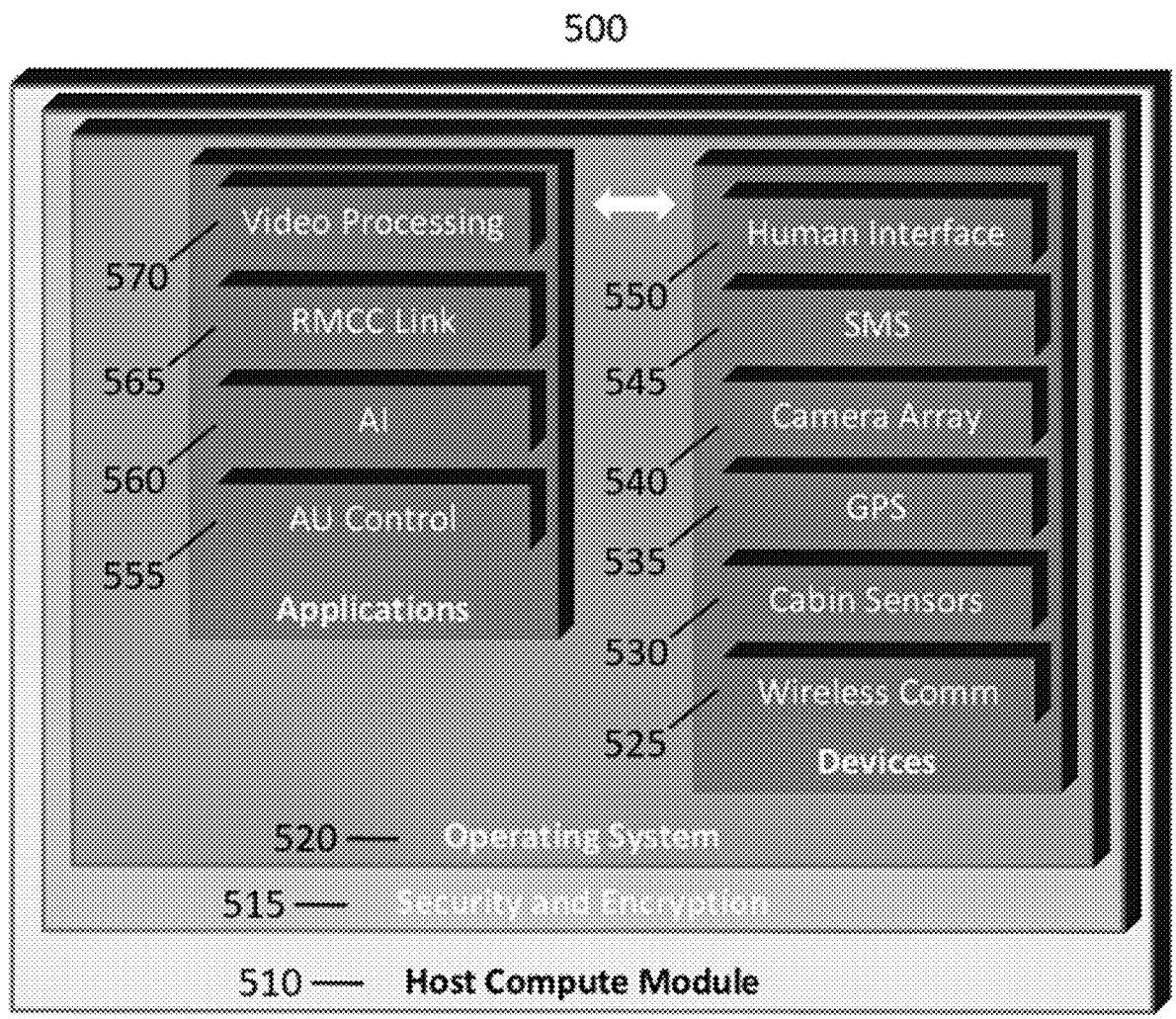
FIG. 5 is a systematic block diagram that provides one example illustration of a generic smart remote monitor and control device (G-SRMCD) employed in the RMCC architecture of FIG. 1 in accordance with various embodiments of the present disclosure.

FIG. 5 illustrates a schematic block diagram of an exemplary G-SRMCD 110a, 110b and 110c. G-SRMCD 110a, 110b and 110c may be similar to exemplary disclosed G-SRMCD 500. The G-SRMCD 500 may include one or more advanced RISC machine (ARM), GPU or CPU processor circuit and operates on a host compute module (HCM) 510. The HCM may include multiple ports and interfaces to connect to the autonomous units 101a, 101b, and 101c and hardware components of the G-SRMCD 500. The controller area network (CAN) bus port allows the G-SRMCD 500 to communicate with other autonomous unit's electronic control units (ECUs). Each ECU may have information that needs to be shared with other ECUs, and the access to the CAN bus may allow the G-SRMCD 500 to obtain sensor data and control the autonomous unit 110a, 110b and 110c. The automotive CAN bus may not operate on all autonomous vehicles. The G-SRMCD 500 can also support media oriented systems transport (MOST), local interconnect network (LIN), CXPI (Clock eXtension Peripheral Interface), SAE J2716 SENT (Single Edge Nibble Transmission), FlexRay or other interfaces and protocols to control and monitor the autonomous unit. The host compute module 510 may also host Ethernet, USB, PCIe, MIPI, GSML, FPDLink III or eSATA interfaces for interconnecting hardware components of the G-SRMCD 500 such as cameras, sensors, and wireless modems. Wi-Fi and Bluetooth protocols may also be supported by the host compute module 510 to interconnect hardware devices to the G-SRMCD 500.

The host compute module 510 may be a microprocessor-based computer board using either an ARM or Intel processor. It should be understood that the G-SRMCD 500 can be implemented in hardware logic, software logic, or a combination of hardware and software logic. In this regard, the G-SRMCD 500 can be or can include any of a digital signal processor (DSP), microprocessor, microcontroller, GPU, or other programmable device which are programmed with software implementing the above described methods. It should be understood that alternatively the G-SRMCD 500 is or includes other logic devices, such as a Field Programmable Gate Array (FPGA), a complex programmable logic device (CPLD), or application specific integrated circuit (ASIC). When it is stated that G-SRMCD 500 performs a function or is configured to perform a function, it should be understood that G-SRMCD 500 is configured to do so with appropriate logic (such as in software, hardware, logic devices, or a combination thereof).

The security and encryption layer 515 may protect some or substantially all the modules and the operating system in the G-SRMCD 500. Data communication between the G-SRMCD 500 and the RMCC 130 and the autonomous units 101a, 101b, and 101c may also be secured, encrypted, and constantly monitored.

The operating system (OS) 520 in the G-SRMCD 500 may be Linux. Suitable packages to operate the G-SRMCD 500 may be installed. The OS may contain the libraries to support video/audio streaming, the G-SRMCD applications and artificial intelligence processing.

The G-SRMCDs 110a, 110b and 110c may contain, in addition to the circuitry and interfaces displayed on the processing device 400, hardware to communicate via a wireless network 120 such as, e.g., a wireless local area network (WLAN) and/or cellular network. The G-SRMCD 500 can include processing circuitry 525 (e.g., a transmitter, receiver, and/or transceiver) to support the wireless communications. For example, the G-SRMCDs 110a, 110b and 110c may support cellular communications such as, e.g., a cellular data connection such as third generation (3G), fourth generation (4G), long term evolution (LTE), fifth generation (5G), or other data communication standard. The G-SRMCDs 110a, 110b and 110c may support wireless communications such as, e.g., IEEE 802.11a/b/g/n and Wi-Fi 6, also known as 802.11ax. The wireless circuitry 525 can be configured to process redundant wireless link connections to the RMCC. Multiple wireless data connections using different wireless bands, private LTE networks or service providers can provide a substantially guaranteed and safe connection to the RMCC 130. In the event the G-SRMCDs 110a, 110b or 110c detect that a network connection is down, based on the local incident risk level the G-SRMCD 500 may indicate the autonomous unit either to continue or safely park until the connection to the RMCC is reestablished. The G-SRMCD 500 may monitor the wireless signal strength, and if a weak signal is detected, the G-SRMCD 500 may inform the RMCC 130 of the event. The RMCC 130 can suggest the autonomous unit 101a, 101b and 101c to avoid that area and reroute the autonomous unit to decrease the incident risk level. In some implementations, the wireless circuitry 525 can provide Wi-Fi access to the passengers in an autonomous vehicle. The Wi-Fi access can provide multiple services to the vehicle passengers such as local tourist information, traffic or weather information, service updates and access to the Internet.

The G-SRMCDs 110a, 110b and 110c can include circuitry to obtain the temperature and humidity levels in the autonomous unit cabin. The cabin sensors 530 may help to determine if the G-SRMCD is in its operational conditions and if passengers (if any) are in a comfortable environment.

The GPS circuitry 535 of the G-SRMCDs 110a, 110b and 110c may support GPS capabilities to determine their geographical location. In the case that the G-SRMCDs 110a, 110b and 110c are not able to access the GPS location obtained by the autonomous units 101a, 101b, and 101c, the G-SRMCD 500 can report the geographical location to the RMCC 130 using its own GPS circuitry 535.

In addition, the G-SRMCD 500 may include multiple cameras and sensors 540 that are integrated into a vehicle and used to video stream live images to the remote-control operator 140. The video streams may be routed to the RMCC 130 via a wireless public or private network 120, the device(s) 525 is the data receiver and transmitter of the G-SRMCD 500. Multiple sensor devices may be installed in the autonomous unit, and the remote-control operator can select the cameras to watch and remotely control and drive the autonomous unit. The G-SRMCD 500 can take advantage of the host compute module 510 processing circuitry to utilize hardware encoders and generate video faster than using software-based algorithms. The system can be extended to employ any sensor modality including lidars, radars, ultrasonic sensors, etc. A more powerful system can be realized by the fusion of a multimodal-sensor system such as any suitable combination of cameras, lidars, radars, and/or ultrasonic sensors. In cases of sensor modalities that generate a large amount of data, data compression may be utilized. Hence, in the case of using visual sensors, video compression/decompression may be used to achieve efficient communication among the vehicles and/or infrastructure. Any suitable video coding standards or technology that is either standalone or built-in within cameras may be used.

The SMS block 545 may allow the G-SRMCD 500 to send and receive text messages via the short message service (SMS) protocol, the short message peer-to-peer protocol (SMPP) or by restful APIs supported by the SMS service provider. The SMS block 545 can be configured to notify a configurable list of administrators if the G-SRMCD 500 loses connection to the RMCC 130. Also, multiple events and/or alarms may be configured to be reported to the administrator(s). The SMS block 545 can also receive text commands, as an alternative communication technique for the G-SRMCD 500. The received G-SRMCD text commands may be validated by the SMS block 545, and once its authenticity is verified, the command may be executed in the G-SRMCD 500. The G-SRMCD text commands may allow execution of tasks on each module of the G-SRMCD 500, for example, to execute troubleshooting routines, prepare and send module reports, activate or deactivate features, request a module shut down or start-up, execute operating system commands, and/or send module statistics.

In some implementations, G-SRMCD 500 may include a human interface 550 installed in the autonomous vehicle cabin. The passenger interface module may allow G-SRMCD 500 to interact with the passengers and allow them to contact a remote-control operator in the RMCC 130 for example in case of an emergency or to make a request related to the autonomous vehicle. The human interface 550 may provide a two-way video and audio communication to the RMCC 130 using the video processing module 570. The human interface may also provide a display with multiple buttons to request, for example, video communication with a remote-control operator, contact emergency services, panic button, display current autonomous unit location on a map, play informative videos, and/or other suitable features. The human interface can be installed in autonomous robots or drones to aid in situations where the unit needs to interact with a human. For example, once the autonomous unit reaches a gated community, it might be appropriate to have the remote-control operator talk to the gate guard, automated kiosk, or display an entry QR code to allow the autonomous unit to enter the house community. In human interaction, the human interface 550 can assist the autonomous unit to either reach the destination or interact with passengers, customers, emergency responders, and/or other individuals.

The applications in the G-SRMCD 500 may use one or more of the available devices and hardware components in the host compute module 510. The following sections describe the devices used by each application layer in at least some exemplary embodiments. The autonomous unit remote control module 555 may allow the remote-control operator 140 to monitor and remotely control the autonomous unit. This module may interconnect to the autonomous unit control interface that allows the RMCC 130 to control, for example, throttle, control steering, activate brakes, shift control (e.g., forward, reverse), watch front/back cameras, listen to autonomous unit surroundings, look at right/left mirror, activate right/left turn signal, turn on headlights, activate horn, activate reverse horn (e.g., if available), turn on/off windshield wipers, shut down the autonomous unit or start-up the autonomous unit. The module 555 may be integrated to multiple protocols to control autonomous units such as, for example, robot operating system (ROS), drive-by-wire or other autonomous unit manufacturers protocols and APIs. The autonomous unit remote control module 555 may include suitable processing circuitry and software to connect and obtain the autonomous units 101*a*, 101*b*, and 101*c* available sensor and alarm data. Accordingly, the autonomous unit control module 555 may allow the G-SRMCDs 110*a*, 110*b* and 110*c* to diagnose and troubleshoot the autonomous unit in the event of a mechanical, hardware or software problem. This data may also include messages created by any advanced driver-assistance system (ADAS) in the autonomous vehicle. The alarm or warning messages may be forwarded to the remote-control operator 140 when controlling the autonomous unit. If the RMCC 130 is not in control of the unit, these messages may be processed by the RMCC 130 and may be used to update the incident risk level or in suitable events (e.g., critical events) request the RMCC 130 to assume immediate control of the autonomous unit. The module 555 may have access to, for example, driver dashboard alarms and warnings, tires pressure, batteries power level, door and locks status, fuel gauge, engine service notification, seatbelt sensors, passenger detection sensors, maintenance service notifications, overall range, speedometer, battery charging status, performance indicators, external temperature, GPS location, video cameras and sensors, and/or other suitable features. The remote control module 555 can disable the autonomous mode in the autonomous unit to take control of the unit, and can also be disabled in the event of an emergency or if the unit needs to be manually controlled.

The AI applications layer 560 may process the input data received from devices 525, 530, 535, 540 and 545 to predict and prevent problems with the autonomous unit. The AI layer 560 may execute various computer vision models and may combine it with the sensor data input features to calculate and update the incident risk level (IRL) to the RMCC 130. The IRL may indicate to the remote-control operator 140 if the autonomous unit is to be provided assistance. In the case of an event reported by the SIPS or SIRS modules, remote control may be immediately requested by the G-SRMCD.

The AI layer 560 may collect data, video and audio for data analytics and artificial intelligence model training purposes. The AI layer 560 may continuously collect, process, and/or analyze the G-SRMCD 500 captured and collected data and may use the wireless data links 525 to send metadata to the RMCC 130. In the event the remote-controller operator 140 detects a SIPS or SIRS false positive or a false negative event, the data associated with the event may be collected for analysis and may provide feedback for the continuous AI training algorithms. Data collection may also be provided to the autonomous unit manufacturer. In the event the AI layer 560 detects a performance problem with the autonomous unit, the data associated with the incident may be collected and shared with the manufacturer so that they can retrain and improve their autonomous algorithms. In the case where an autonomous vehicle is supervised by a human driver, the G-SRMCD 500 can record conditions when a driver takes control over the autonomous mode of the autonomous vehicle. This information may be valuable for the autonomous vehicle makers to fine tune their artificial intelligence algorithms.

The AI layer 560 layer may contain a series of computer vision programs to recognize objects and environments. One of those AI programs may be designated to read the road speed limit signs and detect school zone flashing lights. In the event the unit is above the speed limit, the AI layer 560 may send information of the event to the RMCC 130. The IRL may be increased and the G-SRMCD 500 may request remote control to the RMCC 130. Similarly, the AI layer 560 layer can integrate feedback or data from the autonomous unit artificial intelligence algorithms, update the IRL and, if appropriate, request remote control to the RMCC 130. The autonomous unit can have multiple detection and vision devices for remote objects, cars, or pedestrian detection and may inform the autonomous control system of potential accidents with the autonomous unit. Those events may be processed by the autonomous control system in the autonomous units 101*a*, 101*b*, and 101*c*. The AI layer 560 layer can also process those events and alarms to update the IRL and inform the RMCC 130 if remote assistance is immediately to be provided.

Image data may be captured using the imaging devices 540 in the autonomous unit. Image data may be captured continuously, periodically or in response to a trigger signal. The imaging device may be a camera or any other suitable type of imaging device. Image data may then be analyzed by the AI layer 560 to detect and/or identify objects of interest, such as a pedestrian, another vehicle, or other potential hazards. In an example embodiment, objects may be detected using a You Only Look Once (YOLO) object detection algorithm. For further details regarding YOLO object detection, reference may be had to "YOYL09000: Better, Faster, Stronger" ArXiv:1612.08242 December 2016. Any other suitable type of object detection method may also be utilized.

The RMCC Link 565 may maintain a continuous communication with the RMCC 130 by establishing a persistent virtual circuit network connection through the wireless circuitry 525 to the RMCC 130. The Host Compute Module 510 may collect G-SRMCD and autonomous unit telemetry data to report it to the RMCC 130 using the RMCC Link 565. Additionally, the RMCC Link 565 may verify if there are software updates available and install them for example when the autonomous unit 101a, 101b, or 101c is not in operation. The RMCC 130 may indicate to the G-SRMCDs 110a, 110b and 110c the wireless network to employ and may validate the updates packages providing for the integrity of the G-SRMCD 500.

The Video Processing module 570 may use the accelerated audio and video processing capabilities of the microprocessor CPU(s) and/or GPU(s) for compression and preparation of audio and video bitstreams collected from cameras and other sensors installed in the G-SRMCD or located the autonomous unit. The Video Processing module 570 may use web real-time communication (WebRTC) technology by responding to connection requests from the remote-control operator 140 arriving through the RMCC Link 565 from the vehicle locator and interconnect function of the RMCC 130 in order to establish secure, encrypted peer-to-peer audio and video communication with the remote-control operator workstation 140 with a suitably reduced processing and transmission latency. Encryption may be used for some or substantially all WebRTC components, and hence data communication may be secure between the G-SRMCDs 110a, 110b and 110c and the remote-controller operator 140. The G-SRMCD module 570 may utilize the WebRTC technology, which may compensate and adjust to changing network conditions. The video quality may be adjusted in response to bandwidth availability and may avoid network congestion to deliver suitable voice and video communication. WebRTC may also offer a reliable and redundant session establishment by using the ICE and SCTP protocols. The Video Processing module 570 may utilize the WebRTC data channel to exchange information between the G-SRMCD 500 and the remote-control operator 140. The Video Processing module 570 may use the human interface 550 and camera array 540 devices to deliver video images to the remote-control operator 140.

The G-SRMCD 500 may consume relatively low power from the autonomous unit and/or provide its own source of energy. In at least some exemplary embodiments, the G-SRMCD 500 can use the autonomous unit's battery as a backup in the event its own battery runs out of power. The G-SRMCD 500 battery can be manually charged and/or solar panels can be added to the autonomous vehicle to continuously charge the G-SRMCD 500 battery. The G-SRMCD 500 may monitor the battery level and alert the RMCC 130 if the battery is to be recharged soon.

Figure 6:
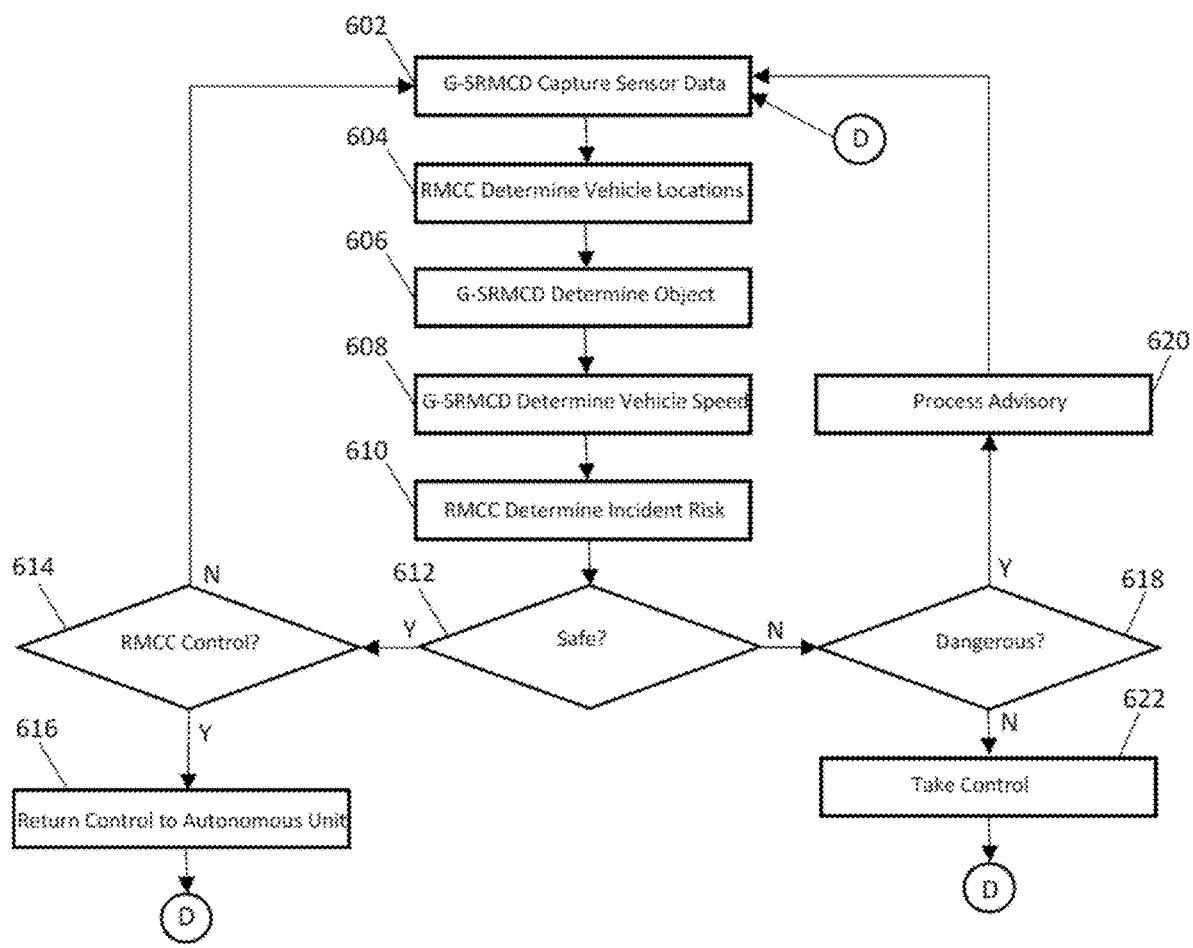
FIG. 6 is a flowchart illustrating an exemplary process for supervising multiple autonomous units and monitoring incident risk by an exemplary RMCC.

FIG. 6 depicts a flowchart illustrating an exemplary process for monitoring the incident risk level implemented in the RMCC 130, in the AI system 100 (as illustrated in FIG. 1). The illustrated process begins at step 602 with the RMCC 130 capturing sensor data from multiple autonomous units. In various examples, the sensors may be distributed across multiple autonomous units. In some embodiments, fused sensor data may be compressed before the sensor data is sent by the autonomous units to the RMCC 130. In an illustrative example, the autonomous units and the RMCC 130 may employ techniques from the data communication and networking field to limit the amount of sensor data transmitted from the autonomous units to the RMCC 130. For example, one or more autonomous units may be configured with artificial intelligence to eliminate redundant sensor data from the sensor data stream sent to the RMCC 130. In such an example, the autonomous unit may send sensor data updates at periodic intervals, or when key sensors change values.

In an example illustrative of various embodiment implementations' design and usage, the RMCC 130 may be configured to simultaneously monitor and control multiple autonomous units, based on sensor data received by the RMCC 130 from the multiple autonomous units. In some examples, the RMCC 130 may determine an independent incident risk level for each autonomous unit of the multiple autonomous units operating under the governance of the RMCC 130. An exemplary disclosed RMCC may assume full or partial control of one or more of the multiple autonomous units determined by the RMCC to be operating at an incident risk level that is not safe. In some embodiments, the RMCC 130 may assume full or partial control of one or more autonomous units for which the RMCC 130 determined an incident risk that is not safe, to restore a safe incident risk based on implementing one or more safety measure or advisory recommendation in the autonomous unit having the incident risk level that is not safe.

In an illustrative example, the RMCC may be configured to characterize the incident risk determined for each autonomous unit as being in at least three ranges: safe, dangerous, and unsafe.

In illustrative examples of monitored autonomous units operating at a safe incident risk level, the RMCC may continue simultaneous monitoring of the individual autonomous units based on determining the incident risk individually for each of the autonomous units, taking control of the autonomous units if the incident risk changes to unsafe, and returning control to the autonomous units when the safe incident risk is restored. A scenario characterized by the RMCC as safe may be referred to as a normal condition and may be displayed or indicated as a 'green' condition to one or more remote-control operators.

In various examples of monitored autonomous units operating at a dangerous incident risk level, the RMCC may issue an advisory action or send an advisory recommendation to one or more autonomous units for which the RMCC determined the incident risk is dangerous, to warn the autonomous unit of the dangerous incident risk. In an illustrative example, a dangerous incident risk may present an increased risk where caution is advised, or partial control may be implemented. A scenario characterized by the RMCC as dangerous may be referred to as a caution, or advisory condition, and may be displayed or indicated as a 'yellow' condition to one or more users. Actions taken by the RMCC in response to a dangerous incident risk for one or more autonomous unit may include simultaneously taking partial control of one or more autonomous units (for example, limiting speed), increasing sensitivity to events that would elevate the level of control to full control (such as, for example, the autonomous unit crossing the center line or the road shoulder), sending a message to the autonomous unit controller to warn the autonomous unit to adapt to the dangerous incident risk, or present an object of interest to the autonomous unit controller or occupant (for example an image of a pedestrian preparing to cross in the autonomous unit's path).

In some examples of monitored autonomous units operating at an unsafe incident risk level, the RMCC may implement a safety measure simultaneously in one or more autonomous units for which the RMCC determined the incident risk is unsafe, to reduce the incident risk level for the one or more autonomous units that were operating at an unsafe incident risk. An unsafe incident risk may present significant and imminent danger of autonomous unit occupant loss of life or injury. In an illustrative example, a scenario characterized by the RMCC as unsafe may be displayed or indicated as a 'red' condition to one or more users. Actions taken by the RMCC in response to an unsafe incident risk for one or more autonomous units may include reducing the speed of one or more autonomous units to increase separation between autonomous units, steering one or more autonomous units to avoid collision, or automatically braking one or more autonomous units to avoid collision.

In some exemplary embodiments, the RMCC may receive, process, and act upon, sensor data from one or more autonomous units that is not operating under the governance of the RMCC. In an illustrative example, an autonomous unit operating under the governance of the RMCC may send sensor data to the RMCC. However such an autonomous unit that is not under the governance of the RMCC may not be capable of accepting control by the RMCC. For example, an autonomous unit that is under the governance of the RMCC may be advised or controlled to reduce incident risk based on the operational behavior of another vehicle that is not under the governance of the RMCC.

In some exemplary embodiments, an incident risk margin may be determined by artificial intelligence configured with historical sensor data. For example, a test vehicle equipped with sensors may permit a neural network or a decision tree to be trained based on sensor data representative of autonomous unit travel on particular roads, or under certain conditions. Such test data could be used to predict a minimum safe risk margin threshold differential with respect to the incident risk determined by the RMCC, for various live autonomous unit driving conditions. In an illustrative example, various embodiment RMCC may determine the incident risk for each autonomous unit as safe, dangerous, or unsafe, characterized as a function of an incident risk, incident risk margin, and/or a minimum safe risk margin threshold.

The depicted method continues at 604 with the RMCC determining the locations of the multiple autonomous units based on the sensor data received from the multiple autonomous units. At 606, the G-SRMCD 500 determines the locations of objects based on the sensor data. Using the sensor data, the G-SRMCD 500 determines the autonomous unit speed at 608. At 610, the G-SRMCD 500 executes a local incident risk evaluation, based on the autonomous unit location, object locations, and autonomous unit speed. The G-SRMCD 500 informs the RMCC 130 of the evaluation outcome to update the RMCC 130 incident risk level. In the event of detecting a possible incident, the G-SRMCD 500 can request the autonomous unit to decrease the speed or stop immediately. In some examples, the incident risk may be determined by the RMCC as a function of whether an object or autonomous unit is of interest to (e.g., affects an operation of) one or more of the multiple autonomous units.

At 612 the RMCC 130 determines if the incident risk level is safe for each autonomous unit of the multiple autonomous units, based on the incident risk evaluated for each autonomous unit as a function of an incident risk margin determined by artificial intelligence configured with historical sensor data. If the incident risk level for each autonomous unit is safe and the RMCC 130 is not in control of the autonomous unit at step 614, the process continues at 602. If the incident risk level is safe and the RMCC 130 is in control of the autonomous unit at step 614, the RMCC 130 returns control to the autonomous unit at 616, and the process continues at 602.

At step 612, if the incident risk level is not safe, the RMCC 130 determines at step 618 if the incident risk level is dangerous, based on the incident risk evaluated for each autonomous unit as a function of an incident risk margin determined by artificial intelligence configured with historical sensor data. If the RMCC 130 determines at step 618 the incident risk level for one or more autonomous unit is not dangerous and the incident risk level can be decreased, the RMCC processes an advisory to generate a recommendation message sent to the one or more autonomous units at 620. In various examples, the advisory recommendation may include a suggestion to the autonomous unit to reduce speed, or may include an image of an object, for example a pedestrian occluded from the autonomous unit's field of view.

If the RMCC 130 determines at 618 the incident risk level for at least one autonomous unit is dangerous, the RMCC 130 at 622 takes control of the at least one autonomous unit, and the method continues at 602 with the RMCC 130 capturing sensor data from multiple autonomous units. In an illustrative example, an exemplary disclosed RMCC may determine incident risk simultaneously for each of a plurality of autonomous units, assuming simultaneous control of one or more of the plurality of autonomous units where the risk level is not dangerous. For example, the exemplary disclosed RMCC could be monitoring one hundred autonomous units, and at a given time, perhaps fifty of the one hundred autonomous units may be determined in need of control by the RMCC based on an unsafe incident risk level determined by the RMCC for each of the fifty autonomous units.

Figure 7:
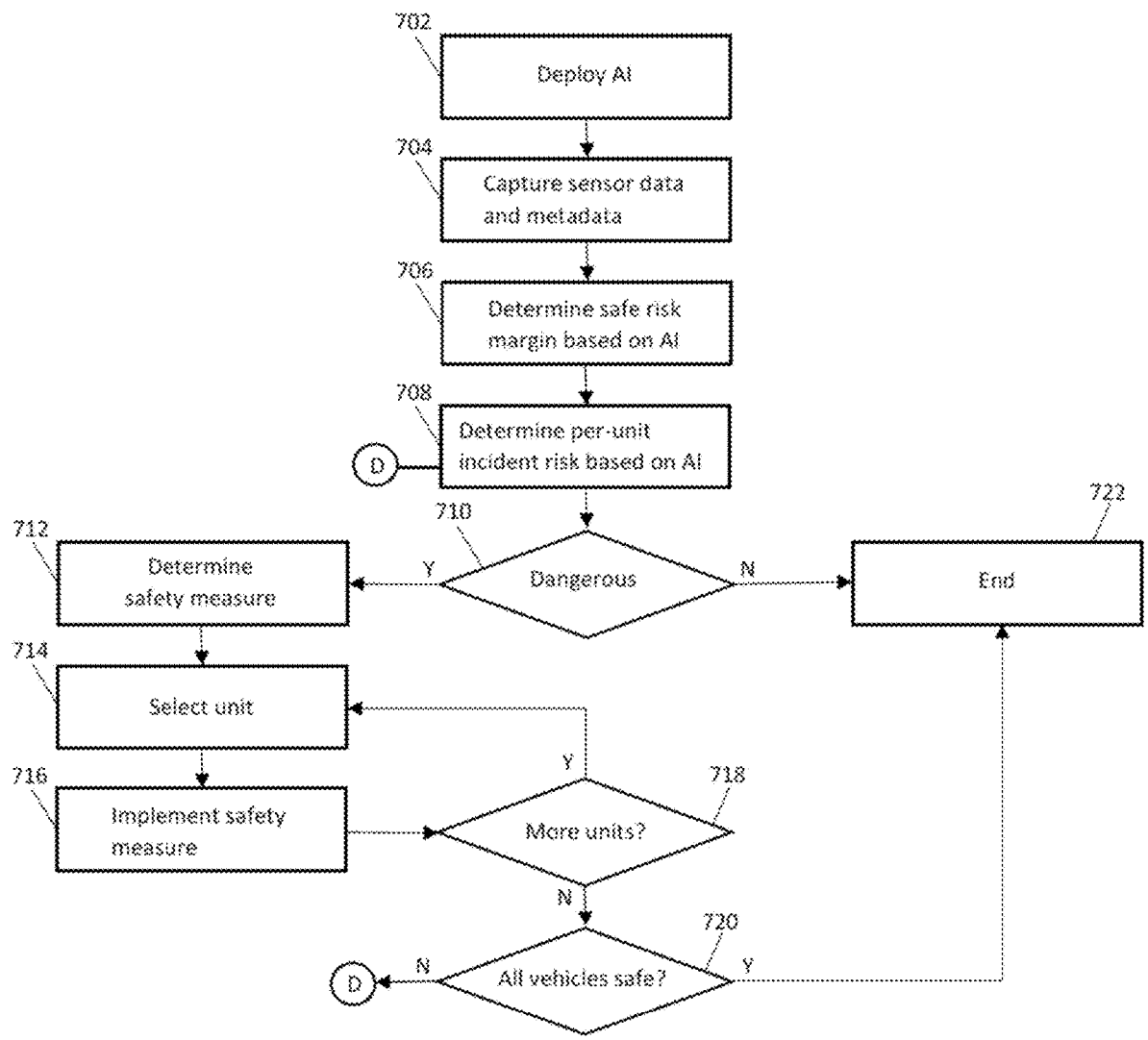
FIG. 7 is a flowchart illustrating an exemplary process for mitigating incident risk for multiple autonomous units by an exemplary RMCC.

FIG. 7 depicts a flowchart illustrating an exemplary process for mitigating incident risk for multiple autonomous units by an exemplary RMCC. In various examples, the process depicted by FIG. 7 may be implemented in the G-SRMCDs 110*a*, 110*b* and 110*c*, and the RMCC 130 in the AI system 100 (as illustrated in FIG. 1). The illustrated process begins at step 702 with the RMCC 130 training and deploying an embedded artificial intelligence (e.g., as disclosed herein) to predict a safe risk margin determined as a function of live sensor data and historical sensor data. The process continues at step 704 with the RMCC 130 capturing live sensor data from the multiple autonomous units. At 706, the RMCC 130 determines the safe risk margin based on the artificial intelligence and the live sensor data and metadata received from the G-SRMCDs 110*a*, 110*b* and 110*c*.

At step 708, the RMCC 130 determines the per-autonomous unit incident risk for each of the multiple autonomous units, based on the artificial intelligence and the live and historical sensor data. If the RMCC 130 determines at step 710 the incident risk level for all autonomous units is not dangerous, the process ends. Otherwise, the RMCC 130 mitigates the dangerous incident risk for at least one of the multiple autonomous units by choosing at 712 an appropriate safety measure determined by artificial intelligence (e.g., for example as described herein). At step 714 the RMCC 130 selects an autonomous unit to implement the chosen safety measure at 716. In various examples, the safety measure may include automatic autonomous unit braking, reducing speed, parking the unit or steering away from a potential collision.

At 718 the RMCC 130 determines if more of the autonomous units are to implement safety measures to reduce the incident risk level to a safe margin. If more autonomous units are to implement safety measures, the RMCC 130 continues selecting an autonomous unit at 714 to implement the safety measure at 716. If all autonomous units have implemented safety measures, the RMCC 130 determines at 720 if the incident risk level for all autonomous units has been reduced to a safe margin. If the RMCC 130 determines at 720 all autonomous units are not operating at a safe risk incident level, the process continues at 708.

Although various examples have been described with reference to the drawings, other examples are possible. For example, various exemplary RMCC embodiments may include an improved distributed information sharing system and methods for monitoring and controlling an autonomous unit, the RMCC being programmed and configured to receive information from a plurality of distributed sensors and metadata; the G-SRMCDs may learn and alert the RMCC when the autonomous unit might receive remote assistance; may determine the existence of an incident, autonomous units, passengers, pedestrians, animals and objects involved in the incident, a nature of the injuries and damages from the incident; may determine if the autonomous unit can be safely moved autonomously from a location where the incident occurred to a second location; may contact an emergency responder when the autonomous unit cannot be safely moved autonomously; may receive a request to transfer control of the autonomous unit from an emergency responder user device; and in response, may transfer control of the automated autonomous unit to a trusted emergency responder without involving approval from an owner of the autonomous unit using encryption and handshake techniques; and may notify an owner or interested party of the autonomous unit of the incident.

In an illustrative example of various embodiments' design and usage, by exchanging basic traffic messages among autonomous units for safety applications, a significantly higher level of safety can be achieved when autonomous units and designated infrastructure-locations share their sensor data. While cameras installed in one autonomous unit can provide visual information for mitigating many avoidable accidents, a new safety paradigm is envisioned where visual data captured by multiple autonomous units are shared and combined (e.g., fused) for significantly more optimized active safety and driver assistance systems. The sharing of visual data may be motivated by the fact that some critical visual views captured by one autonomous unit or by an infrastructure-location may not be visible or captured by other autonomous units in the same environment. Sharing such data in real-time provides an invaluable new level of awareness that can significantly enhance a driver assistance, connected autonomous unit, and/or autonomous unit's safety-system.

In at least some exemplary embodiments, the present invention is directed to methods and systems for operation of an autonomous unit. More specifically, some embodiments of the present invention are directed to methods and systems to handoff control of an autonomous unit to an emergency responder that is human or autonomous or a human autonomous unit occupant, in the event of an accident or other emergency.

Some portions of the above description present the techniques described herein in terms of algorithms and symbolic representations of operations on information. These algorithmic descriptions and representations may be used to convey the substance of work. These operations, while described functionally or logically, may be implemented by computer programs. Furthermore, it may be convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

At least some exemplary embodiments of the present disclosure also relate to an apparatus for performing the operations herein. This apparatus may be specially constructed for the desired purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability. Some or all functionalities described above could also be provided by private or Public cloud-based Data Centers (DC).

The algorithms and operations presented herein are not inherently related to any particular computer or other apparatus. Various general-purpose systems may also be used with programs in accordance with the teachings herein, or it may prove convenient to construct more specialized apparatuses to perform the desired method steps. The desired structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The flowcharts of FIGS. 2, 3, 6, and 7 show the functionality and operation of an implementation of portions of the autonomous units 101a, 101b, and 101c, the G-SRMCDs 110a, 110b and 110c, the RMCC 109, and the AI system 100. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as the G-SRMCDs 110a, 110b and 110c and the RMCC 130 in a computer system, embedded system or other system. The machine code may be converted from the source code, etc. If embodied in hardware, each block may represent a circuit or a number of interconnected circuits to implement the specified logical function(s).

Although the flowcharts of FIGS. 2, 3, 6 and 7 show a specific order of execution, it is understood that the order of execution may differ from that which is depicted. For example, the order of execution of two or more blocks may be scrambled relative to the order shown. Also, two or more blocks shown in succession in FIGS. 2, 3, 6, and 7 may be executed concurrently or with partial concurrence. Further, in some embodiments, one or more of the blocks shown in FIGS. 2, 3, 6, and 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the AI system application(s) in RMCC 130 and/or application(s) 550, that comprises software or code can be embodied in any non-transitory computer-readable medium for use by or in connection with an instruction execution system such as, for example, an host compute module 510 or RMCC 130 in a computer system, embedded system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), secure digital card (SD) or other type of memory device.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on this application based hereon. Accordingly, the disclosure of the embodiments of the invention is intended to be illustrative, but not limiting, of the scope of the invention.

In at least come exemplary embodiments, the exemplary disclosed apparatus may be an autonomous unit remote monitoring and control center (RMCC) apparatus, including at least one processing device, the RMCC programmed and configured to: receive sensor data, metadata, video and audio streams processed by a plurality of generic smart remote monitor and control devices (G-SRMCDs) installed across a plurality of independently governed autonomous units (vehicles, robots or drones) operating remotely from the RMCC, the sensor data includes data of autonomous units not operating under control of the RMCC, determine an incident risk level of a plurality of independently governed autonomous units remote from the RMCC, wherein the incident risk level is determined based on artificial intelligence trained as a function of received fused image sensor data and metadata captured by a plurality of G-SRMCDs installed across the plurality of autonomous units, and wherein the incident risk level is determined based on a criterion determining whether an object visually encoded by the image sensor data captured from one autonomous unit is of interest to at least another of the autonomous units, and determine an incident risk margin calculated as a function of comparing the incident risk level with a predetermined safe risk level threshold, wherein the safe risk level threshold is predetermined by artificial intelligence configured as a function of historical training data captured by a test G-SRMCD. The RMCC may also be programmed and configured to, in response to determining the incident risk margin is less than a predetermined safe minimum risk margin, take control of one or more of the plurality of autonomous units operating at the incident risk margin that is less than the predetermined safe minimum risk margin, to restore a safe incident risk level for the autonomous units based on governing the operation of the plurality of autonomous units to increase the separation distance between at least two autonomous units based on changing the velocity vector of at least one autonomous unit of the plurality of autonomous units, and, in response to determining the incident risk has been restored to a safe level based on comparing the incident risk to the predetermined safe minimum risk margin, return control to the one or more of the plurality of autonomous units, and, in response to determining the incident risk margin is equal to or greater than a predetermined safe minimum risk margin, determine the incident risk level is safe. The RMCC may also be programmed and configured to, in response to determining the existence of an incident based upon the information received from the plurality of distributed G-SRMCDs, determine autonomous units, passengers, pedestrians, animals and objects involved in the incident and a nature of injuries and damages to the autonomous units, passengers, pedestrians, animals and objects involved in the incident based on the information received from the G-SRMCDs, determine if the autonomous unit can be safely moved autonomously from a location where the incident occurred to a second location, and, in response to determining the autonomous unit can safely be moved to the second location autonomously, move the autonomous unit to the second location and park the autonomous unit. The exemplary disclosed apparatus may further include the RMCC programmed and configured in response to determining the incident risk level is safe, to display a human-visible green indication on an RMCC monitor. The exemplary disclosed apparatus may also include the RMCC programmed and configured in response to determining the incident risk level is dangerous, to display a human-visible yellow indication on an RMCC monitor. The exemplary disclosed apparatus may further include the RMCC programmed and configured wherein in response to determining the incident risk level is unsafe, display a human-visible red indication on an RMCC monitor.

In at least some exemplary disclosed embodiments, the exemplary disclosed apparatus and associated methods may relate to configuring a controller to simultaneously monitor the incident risk levels of multiple independently governed autonomous units (e.g., vehicles, robots and drones) remote from the controller, and, in response to an unsafe incident risk level for one or more units determined by the controller, taking control of the one or more autonomous unit having an unsafe incident risk level, to restore a safe incident risk level, and, in response to determining incident risk has been restored to a safe level, returning control to the autonomous units. In an illustrative example, incident risk may be determined for each of the multiple units individually, and as a group, based on data from Generic Smart Remote Monitor and Control Devices (G-SRMCDs) installed across the multiple units. Sensor data from multiple units may be fused, permitting accurate incident risk determination for a group of autonomous units. In some examples, safety measures may be targeted by artificial intelligence to an individual autonomous unit or a vehicle, robot or drone group, to reduce incident risk to a safe level, based on increasing the separation between vehicles, robots or drones, or reducing vehicle speed. The G-SRMCD may collect sensor data from the autonomous unit, by using artificial intelligence methods it determines if the autonomous unit is to be provided assistance or to be remotely controlled and notifies the remote-control operator with metadata to update the incident risk level. The G-SRMCD can provide remote control of the autonomous unit to the controller when the incident risk level is low or when the G-SRMCD detected the autonomous unit is to receive urgent assistance.

In at least some exemplary disclosed embodiments, the exemplary disclosed G-SRMCD may predict and detect deadlock situations when the autonomous unit may require assistance. The exemplary disclosed G-SRMCD can detect and report incidents to a Remote Monitoring Control Center (RMCC). The exemplary disclosed G-SRMCD can collect its own telemetry including GPS data and inform the RMCC of any issue with the autonomous unit. The exemplary disclosed G-SRMCD may learn when the autonomous unit will usually require assistance, detect that particular event and report it to the RMCC. The exemplary disclosed G-SRMCD may detect speed limit signs, school zones, and verify if the autonomous unit follows the traffic rules, otherwise it will notify the RMCC. The exemplary disclosed G-SRMCD can record conditions where the autonomous unit is provided with assistance, telemetry data, sensor data, audio and video are collected and shared with the autonomous unit maker. The exemplary disclosed G-SRMCD can provide multiple services to the vehicle passengers, such a touch screen and being able to video call to an RMCC agent, provide interactive applications and Wi-Fi access. The passenger interface can also provide panic or emergency buttons. The exemplary disclosed G-SRMCD can assist the autonomous unit when human interaction is required, particularly when delivering goods. For example, the autonomous unit may talk to a gate guard, an automatic kiosk, and/or another party or device. The exemplary disclosed G-SRMCD can request remote assistance when is about to reach the destination (e.g., to assist the unit to deliver goods and needs to get off the street). The exemplary disclosed G-SRMCD may deliver audio and video mainly by using either a commercial public or a private mobile data network employing either LTE or 5G cellular network standards to provide (e.g., substantially guarantee) with a low latency the high bandwidth video stream to the RMCC. The exemplary disclosed G-SRMCD may include multiple AI applications: smart incident prevention system (SIPS), Smart incident reporting system (SIRS), Incident Risk Level Prediction (IRLP), among other applications dedicated to predict and report events to the RMCC. The exemplary disclosed G-SRMCD may contain an SMS module as an alternative via of communication to the equipment. Text commands may allow the system to diagnose and obtain reports from any module in the G-SRMCD. Additionally, the text commands can request actions, activate or deactivate features in any module of the G-SRMCD. The exemplary disclosed G-SRMCD may be designed and optimized to use private LTE networks or 5G networks to guarantee with a low latency the high bandwidth video stream to the RMCC.

In at least some exemplary disclosed embodiments, the exemplary disclosed AI application may read road speed limit signs and detect school zone flashing lights. In the event the autonomous unit is above the speed limit, the RMCC may be immediately notified.

In at least some exemplary disclosed embodiments, the exemplary disclosed G-SRMCD may verify if there are software updates available and install them when the autonomous unit is not in operation. The exemplary disclosed G-SRMCD may send and receive SMS via multiple protocols. The SMS module can receive text commands (e.g., this may be an alternative via of communication to the G-SRMCD). This module may allow execution of tasks on each module of the G-SRMCD, for example, executing troubleshooting routines, preparing and sending module reports, activating or deactivating features, requesting a module shut down or start-up, executing operating system commands, and/or sending module statistics. The exemplary disclosed G-SRMCD may offer passenger services such as touch screens to communicate with a remote agent via a video call, reporting an emergency, and/or displaying information on the touchscreen or Wi-Fi service. Other services can be offered via the Wi-Fi service. The exemplary disclosed G-SRMCD may assist the autonomous unit when human interaction is involved, for example when delivering goods. The autonomous unit may talk to a gate guard, an automatic kiosk, and/or other devices or individuals. The exemplary disclosed G-SRMCD may provide its own power source. The exemplary disclosed G-SRMCD may capture the temperature and humidity levels in the autonomous unit (e.g., this information may help to determine if the G-SRMCD is in its operational conditions and if passengers, if any, are in a comfortable environment. The exemplary disclosed G-SRMCD may record conditions where the autonomous unit is to receive assistance and/or when telemetry data, sensor data, audio and video are to be collected and shared with the autonomous unit maker. The exemplary disclosed G-SRMCD may deliver audio and video to the RMCC relatively quickly (e.g., much faster) due to the private LTE network, which may minimize the data being transferred to the RMCC, and by increasing the processing power of the G-SRMCD.

In at least some exemplary disclosed embodiments, the exemplary disclosed G-SRMCD AI applications may be designed to prevent accidents in addition to reporting accidents. The G-SRMCD may use computer vision algorithms and inform the RMCC when the autonomous unit will require remote control to prevent an accident. The exemplary disclosed G-SRMCD may instruct the autonomous unit to take immediate action if an accident is about to happen or to avoid a potential accident (e.g., in at least some exemplary embodiments, this may provide faster decision-making process than sending sensor data to the RMCC). The exemplary disclosed G-SRMCD may have an alternative technique of communication by using SMS, which may add redundancy and an easy channel of communication with the G-SRMCD. The exemplary disclosed G-SRMCD may add a "human touch" to an autonomous vehicle by providing the possibility to talk or request help to a remote-control operator. Alternative ways to request emergency services can be provided by the G-SRMCD touch screen. The exemplary disclosed G-SRMCD may provide Wi-Fi service, which may provide an opportunity for advertisement options before vehicle passengers can connect to the Internet. The exemplary disclosed G-SRMCD may extend autonomous delivery devices capabilities as it offers a way to interact with a gate guard or an automatic kiosk. The exemplary disclosed G-SRMCD may provide its own battery power, which may avoid consuming an autonomous unit's batteries (e.g., which may improve electric vehicle performance).

In at least some exemplary disclosed embodiments, the exemplary disclosed system may include a control module, comprising computer-executable code stored in non-volatile memory, a processor, a control center device (e.g., RMCC), and a plurality of autonomous devices that operate remotely from the control center device, each of the plurality of autonomous devices including a control device (e.g., G-SRMCD). The control module, the processor, the control center device, and the control devices may be configured to collect data using one or more collection devices disposed at each of the plurality of autonomous devices, process the collected data using the control devices disposed at the plurality of autonomous devices, transfer the processed data from the control devices to the control center device when the plurality of autonomous devices are autonomously operating without control by the control center device, train artificial intelligence as a function of the processed data transferred from the control devices, determine an incident risk level of the plurality of autonomous devices operating without control by the control center device based on the artificial intelligence, and take control of at least one of the plurality of autonomous devices based on the incident risk level. The plurality of autonomous devices may be selected from the group consisting of vehicles, robots, and drones. The one or more collection devices disposed at each of the plurality of autonomous devices may be selected from the group consisting of sensors and imaging devices. Transferring the processed data from the control devices to the control center device may include streaming sensor data, metadata, video data, and audio data. The incident risk level may be determined based on a criterion determining whether an object visually encoded by an image sensor data of the processed data transferred by one of the control devices disposed on one of the autonomous devices affects an operation of at least another of the autonomous devices. The control module, the processor, the control center device, and the control devices may be further configured to determine an incident risk margin based on comparing the incident risk level with a predetermined safe risk level threshold. The predetermined safe risk level threshold may be predetermined by the artificial intelligence being configured as a function of historical training data captured by a test control device. The control module, the processor, the control center device, and the control devices may be further configured, in response to determining that the incident risk margin is less than a predetermined safe minimum risk margin, to take control of at least one of the plurality of autonomous devices, which may be operating at the incident risk margin that is less than the predetermined safe minimum risk margin, by transferring data from the control center device to one or more control devices, and to increase a separation distance between two or more of the plurality of autonomous devices by changing a velocity vector of the at least one of the plurality of autonomous devices by controlling an operation of the at least one of the plurality of autonomous devices. The control module, the processor, the control center device, and the control devices may be further configured to restore a safe incident risk level for the plurality of autonomous devices based on controlling an operation of the at least one of the plurality of autonomous devices, and to return control to the at least one of the plurality of autonomous devices when the safe incident risk level for the plurality of autonomous devices is restored. Restoring the safe incident risk level may include determining the safe incident risk level based on comparing an incident risk to the predetermined safe minimum risk margin. The control module, the processor, the control center device, and the control devices may be further configured, in response to determining that the incident risk margin is equal to or greater than a predetermined safe minimum risk margin, to determine the incident risk level is safe.

In at least some exemplary disclosed embodiments, the exemplary disclosed method may include providing a control center device (e.g., RMCC), providing a plurality of autonomous devices that operate remotely from the control center device, each of the plurality of autonomous devices including a control device (e.g., G-SRMCD), collecting data using one or more collection devices disposed at each of the plurality of autonomous devices, processing the collected data using the control devices disposed at the plurality of autonomous devices, and transferring the processed data from the control devices to the control center device when the plurality of autonomous devices are autonomously operating without control by the control center device. The exemplary disclosed method may also include training artificial intelligence as a function of the processed data transferred from the control devices, determining an incident risk level of the plurality of autonomous devices operating without control by the control center device based on the artificial intelligence, and taking control of at least one of the plurality of autonomous devices based on the incident risk level. The exemplary disclosed method may also include, in response to identifying an incident based on the artificial intelligence trained as a function of the processed data, determining one or more items involved in the incident and a nature of damage to the one or more items based on the processed data from the control devices. The exemplary disclosed method may further include determining, based on the artificial intelligence, if the autonomous device is safely movable autonomously from a first location where the incident occurred to a second location, and moving the autonomous device autonomously from the first location to the second location when it is determined that the autonomous device is safely movable autonomously from the first location to the second location. The one or more items may include at least one selected from the group of autonomous devices, passengers, pedestrians, animals, physical objects, and combinations thereof. The exemplary disclosed method may also include displaying a first indication on a user interface of the control center device when the incident risk level is safe, displaying a second indication on the user interface of the control center device when the incident risk level is dangerous, and displaying a third indication on the user interface of the control center device when the incident risk level is unsafe. The first indication may be a human-visible green indication. The second indication may be a human-visible yellow indication. The third indication may be a human-visible red indication. The processed data is transmitted from the control devices to the control center device via a commercial public or private mobile data network utilizing either LTE or 5G standards. The processed data may include high bandwidth audio and video streams.

In at least some exemplary disclosed embodiments, the exemplary disclosed system may include a control module, comprising computer-executable code stored in non-volatile memory, a processor, a control center device (e.g., RMCC), and a plurality of autonomous devices that operate remotely from the control center device, each of the plurality of autonomous devices including a control device (e.g., G-SRMCD). The control module, the processor, the control center device, and the control devices may be configured to collect data using sensors or imaging devices disposed at each of the plurality of autonomous devices, process the collected data using each of the control devices disposed at the plurality of autonomous devices, transfer the processed data from each of the control devices to the control center device when the plurality of autonomous devices are autonomously operating without control by the control center device, train artificial intelligence as a function of the processed data transferred from each of the control devices, determine an incident risk level of the plurality of autonomous devices operating without control by the control center device based on the artificial intelligence, take control of at least one of the plurality of autonomous devices based on the incident risk level, determine an incident risk margin based on comparing the incident risk level with a predetermined safe risk level threshold, and take control of at least one of the plurality of autonomous devices, which is operating at the incident risk margin that is less than the predetermined safe minimum risk margin, by transferring data from the control center device to one or more control devices. The control module, the processor, the control center device, and the control devices may be further configured to increase a separation distance between two or more of the plurality of autonomous devices by changing a velocity vector of the at least one of the plurality of autonomous devices by controlling an operation of the at least one of the plurality of autonomous devices. Each of the control devices may include a control device module (e.g., host compute module 510) having an artificial intelligence layer configured to continuously collect, process, and analyze the collected data to produce the processed data, and recognize objects and environments near the autonomous device by using a computer vision program of the control device module.

The exemplary disclosed system and method may be used in any suitable application for remote monitoring of a vehicle. For example, the exemplary disclosed system and method may be used in any suitable application for remote monitoring of an autonomous vehicle, robot, and/or drone.

The exemplary disclosed system and method may provide an efficient and effective technique for remote monitoring of a vehicle. The exemplary disclosed system and method may also reduce or substantially eliminate potential artificial intelligence ethical dilemmas. The exemplary disclosed system and method may provide for monitoring multiple independent autonomous units, taking control of one or more of the independent autonomous units to govern the unit's operation, and returning control to one or more independent autonomous units when safe operation is restored.

Figure 8:
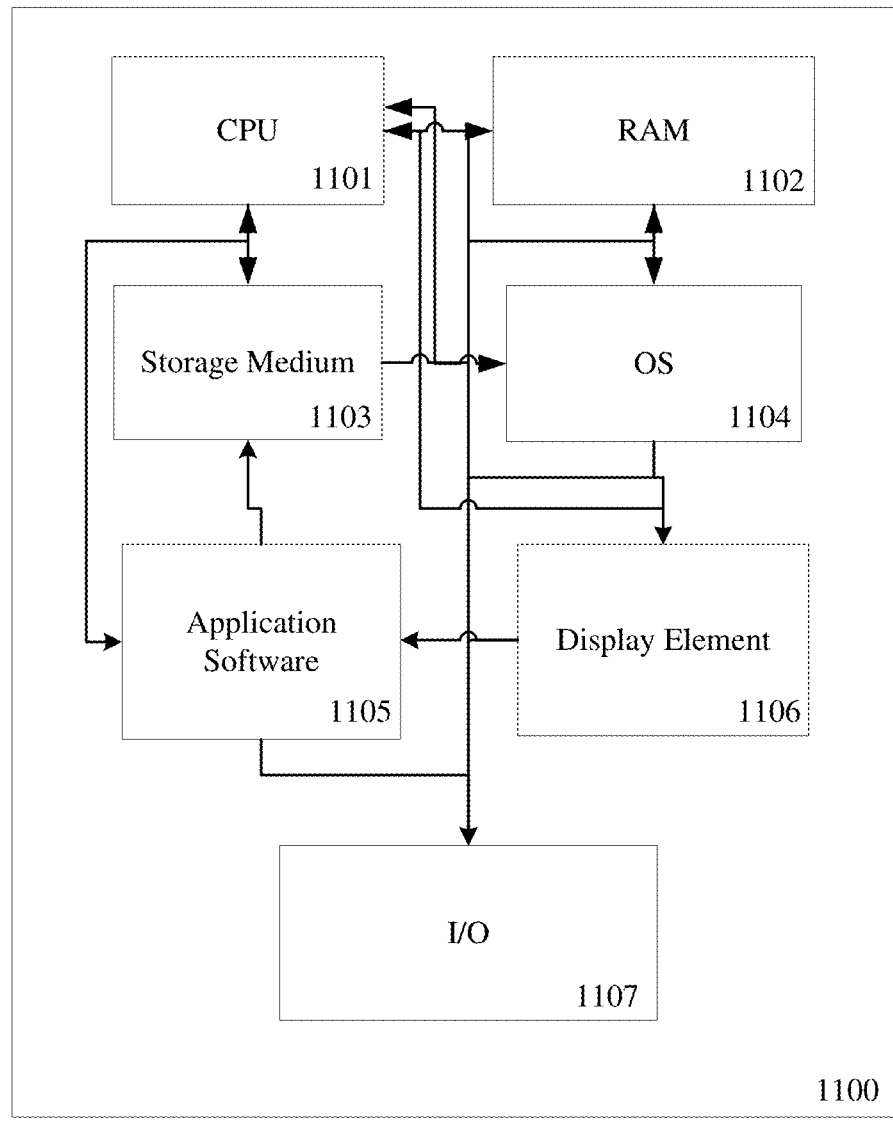
FIG. 8 is a schematic illustration of an exemplary computing device, in accordance with at least some exemplary embodiments of the present disclosure.

An illustrative representation of a computing device appropriate for use with embodiments of the system of the present disclosure is shown in FIG. 8. The computing device 1100 can generally be comprised of a Central Processing Unit (CPU, 1101), optional further processing units including a graphics processing unit (GPU), a Random Access Memory (RAM, 1102), a mother board 1103, or alternatively/additionally a storage medium (e.g., hard disk drive, solid state drive, flash memory, cloud storage), an operating system (OS, 1104), one or more application software 1105, a display element 1106, and one or more input/output devices/means 1107, including one or more communication interfaces (e.g., RS232, Ethernet, Wi-Fi, Bluetooth, USB). Useful examples include, but are not limited to, personal computers, smart phones, laptops, mobile computing devices, tablet PCs, and servers. Multiple computing devices can be operably linked to form a computer network in a manner as to distribute and share one or more resources, such as clustered computing devices and server banks/farms.

Various examples of such general-purpose multi-unit computer networks suitable for embodiments of the disclosure, their typical configuration and many standardized communication links are well known to one skilled in the art, as explained in more detail and illustrated by FIG. 9, which is discussed herein-below.

According to an exemplary embodiment of the present disclosure, data may be transferred to the system, stored by the system and/or transferred by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present disclosure are contemplated for use with any configuration.

In general, the system and methods provided herein may be employed by a user of a computing device whether connected to a network or not. Similarly, some steps of the methods provided herein may be performed by components and modules of the system whether connected or not. While such components/modules are offline, and the data they generated will then be transmitted to the relevant other parts of the system once the offline component/module comes again online with the rest of the network (or a relevant part thereof). According to an embodiment of the present disclosure, some of the applications of the present disclosure may not be accessible when not connected to a network, however a user or a module/component of the system itself may be able to compose data offline from the remainder of the system that will be consumed by the system or its other components when the user/offline system component or module is later connected to the system network.

Figure 9:
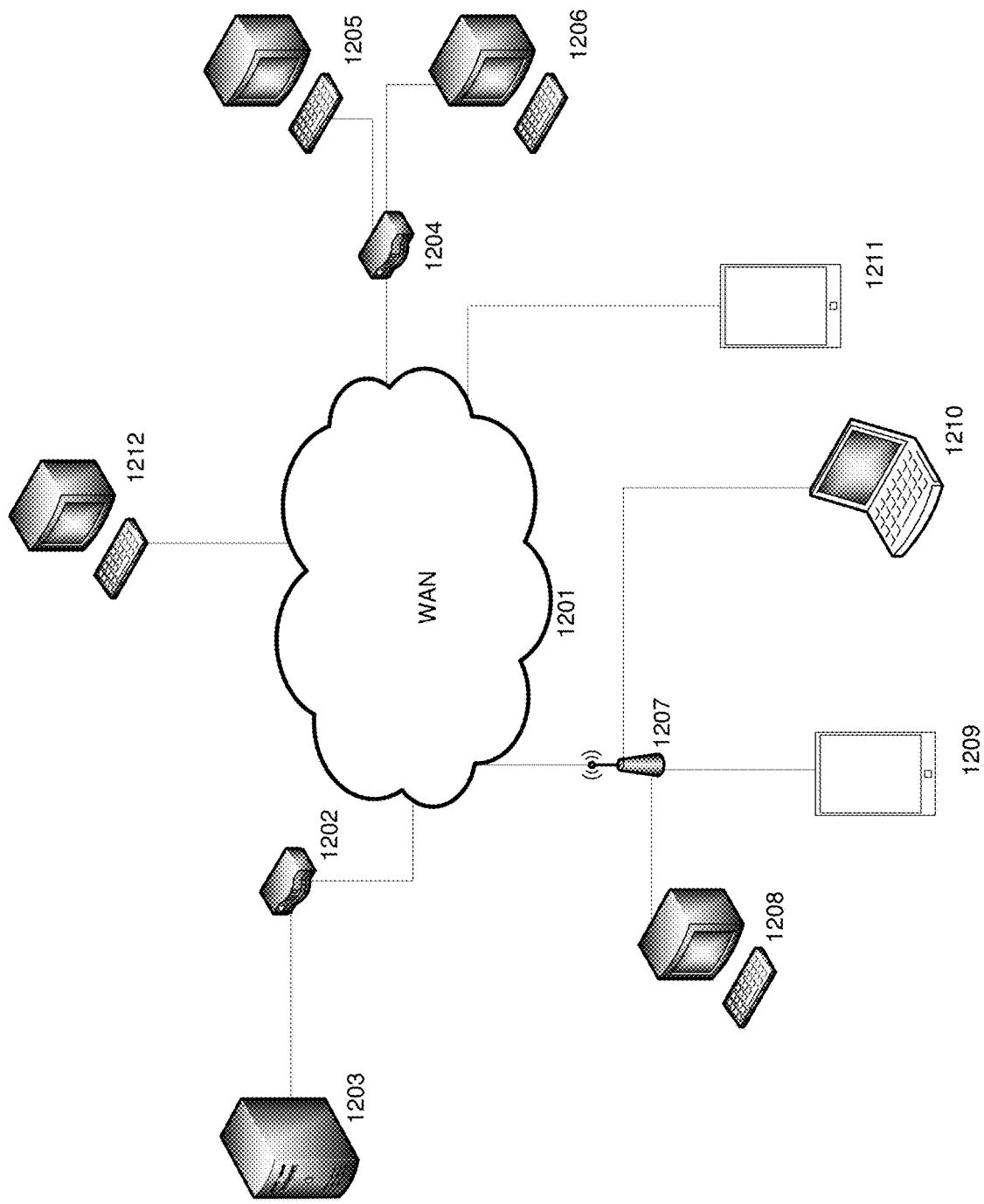
FIG. 9 is a schematic illustration of an exemplary network, in accordance with at least some exemplary embodiments of the present disclosure.

Referring to FIG. 9, a schematic overview of a system in accordance with an embodiment of the present disclosure is shown. The system is comprised of one or more application servers 1203 for electronically storing information used by the system. Applications in the server 1203 may retrieve and manipulate information in storage devices and exchange information through a WAN 1201 (e.g., the Internet). Applications in server 1203 may also be used to manipulate information stored remotely and process and analyze data stored remotely across a WAN 1201 (e.g., the Internet).

According to an exemplary embodiment, as shown in FIG. 9, exchange of information through the WAN 1201 or other network may occur through one or more high speed connections. In some cases, high speed connections may be over-the-air (OTA), passed through networked systems, directly connected to one or more WANs 1201 or directed through one or more routers 1202. Router(s) 1202 are completely optional and other embodiments in accordance with the present disclosure may or may not utilize one or more routers 1202. One of ordinary skill in the art would appreciate that there are numerous ways server 1203 may connect to WAN 1201 for the exchange of information, and embodiments of the present disclosure are contemplated for use with any method for connecting to networks for the purpose of exchanging information. Further, while this application refers to high speed connections, embodiments of the present disclosure may be utilized with connections of any speed.

Components or modules of the system may connect to server 1203 via WAN 1201 or other network in numerous ways. For instance, a component or module may connect to the system i) through a computing device 1212 directly connected to the WAN 1201, ii) through a computing device 1205, 1206 connected to the WAN 1201 through a routing device 1204, iii) through a computing device 1208, 1209, 1210 connected to a wireless access point 1207 or iv) through a computing device 1211 via a wireless connection (e.g., CDMA, GMS, 3G, 4G, 5G) to the WAN 1201. One of ordinary skill in the art will appreciate that there are numerous ways that a component or module may connect to server 1203 via WAN 1201 or other network, and embodiments of the present disclosure are contemplated for use with any method for connecting to server 1203 via WAN 1201 or other network. Furthermore, server 1203 could be comprised of a personal computing device, such as a smartphone, acting as a host for other computing devices to connect to.

The communications means of the system may be any means for communicating data, including image and video, over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Regardless of the type of computer program or computing device involved, a computer program can be loaded onto a computing device to produce a particular machine that can perform any and all of the depicted functions. This particular machine (or networked configuration thereof) provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

While the foregoing drawings and description set forth functional aspects of the disclosed systems, no particular arrangement of software for implementing these functional aspects should be inferred from these descriptions unless explicitly stated or otherwise clear from the context.

While multiple embodiments are disclosed, still other embodiments of the present disclosure will become apparent to those skilled in the art from this detailed description. The alternatives described herein are examples for illustration only and not to limit the alternatives in any way. The steps of the invention can be performed in a different order and still achieve desirable results. It will be obvious to persons skilled in the art to make various changes and modifications to the invention described herein. To the extent that these variations depart from the scope and spirit of what is described herein, they are intended to be encompassed therein. It will be understood by those skilled in the art that various changes in form and details may be made therein without departing from the scope of the invention encompassed by the appended claims.

What is claimed is:

1. A remote monitoring control device, comprising:
    a controller including a microprocessor-based computer board;
    a wireless communication device;
    a sensor and a camera;
    a remote control module, including processing circuitry and software, that communicates with an autonomous unit in which the remote monitoring control device is located and a remote monitoring control center,
    wherein the remote control module is configured to stop autonomous control of the autonomous unit and hand off full control of the autonomous unit to the remote monitoring control center based on an incident risk level being an unsafe level or a dangerous level,
    wherein the remote control module is configured to communicate with a plurality of other remote monitoring control devices of other autonomous units;
    wherein the remote control module is configured to restart autonomous control of the autonomous unit based on the incident risk level being a safe level;
    wherein the incident risk level is based on data communication between the remote monitoring control device and the plurality of other remote monitoring control devices; and
    wherein the data communication comprises real-time visual data that comprises visual views captured by the plurality of other remote monitoring control devices in a same environment as monitored by the plurality of other remote monitoring control devices.

2. The remote monitoring control device of claim 1, wherein an artificial intelligence applications layer of the remote monitoring control center, including a processing circuitry, processes input data received from the sensor and the camera,
    wherein the artificial intelligence applications layer calculates and updates the incident risk level based on at least one of the input data received from the sensor and the camera or external sources of data including weather or traffic data, and the remote control module is configured to transfer a signal via the wireless communication device to disable an autonomous mode of the autonomous unit based on the incident risk level being the unsafe level or the dangerous level.

3. The remote monitoring control device of claim 1, wherein the artificial intelligence applications layer executes a computer vision model and combines the computer vision model with the input data to calculate and update the incident risk level.

4. The remote monitoring control device of claim 1, further comprising a cabin sensor configured to sense a temperature and a humidity of a cabin of the autonomous unit.

5. The remote monitoring control device of claim 1, further comprising a user communication device including a display that provides two-way video and audio communication with human users located in a cabin of the autonomous unit using a video processing module.

6. The remote monitoring control device of claim 1, further comprising at least one of GPS circuitry and an SMS protocol texting device that sends and receives text messages.

7. The remote monitoring control device of claim 1, wherein:

the sensor and the camera include at least one selected from the group consisting of a lidar, a radar, and an ultrasonic sensor; and the camera is configured to provide video stream live images.

8. The remote monitoring control device of claim 1, further comprising a host compute layer, including hardware connections, that collects telemetry data of the autonomous unit.

9. A method, comprising:

providing a remote monitoring control device including a processor at each of a plurality of autonomous devices;

configuring each of the remote monitoring control devices to communicate with a remote monitoring control center;

configuring each of the remote monitoring control devices to communicate with one or more collection devices including sensors and cameras disposed at each of the plurality of autonomous devices;

receiving collected data from each of the one or more collection devices;

processing the collected data;

transferring the processed data to the remote monitoring control center when the plurality of autonomous devices are autonomously operating without control by the remote monitoring control center;

training artificial intelligence as a function of the processed data;

determining an incident risk level of each of the plurality of autonomous devices operating without control by the remote monitoring control center based on the artificial intelligence;

stopping autonomous control of at least one of the plurality of autonomous devices and handing off full control of the at least one of the plurality of autonomous devices to the remote monitoring control center based on transferring a command from the remote monitoring control center to the remote monitoring control device to take control of the at least one of the plurality of autonomous devices when the incident risk level changes from a safe level to an unsafe level or a dangerous level;

returning autonomous control to the at least one of the plurality of autonomous devices when the safe level of the incident risk level is restored;

wherein the incident risk level is based on data communication between the remote monitoring control devices;

wherein the data communication comprises real-time visual data that comprises visual views captured by the remote monitoring control devices in a same environment as monitored by the remote monitoring control devices; and adjusting the incident risk level based on controlling a movement of at least one of the plurality of autonomous devices.

10. The method of claim 9, wherein transferring the processed data from the remote monitoring control devices to the remote monitoring control center includes transferring a high bandwidth audio and video streams via at least one of a commercial public or a private LTE, Wi-Fi, or 5G network.

11. The method of claim 9, wherein:

the plurality of autonomous devices are selected from the group consisting of vehicles, robots, and drones; and each of the one or more collection devices disposed at each of the plurality of autonomous devices are selected from the group consisting of sensors and imaging devices.

12. The method of claim 9, wherein transferring the processed data to the remote monitoring control center includes streaming sensor data, metadata, video data, and audio data.

13. The method of claim 9, wherein each of the remote monitoring control devices includes a remote monitoring control device module having an artificial intelligence layer configured to:

continuously collect, process, and analyze the collected data to produce the processed data; and recognize objects and environments by using a computer vision program of the remote monitoring control device module.

14. A remote monitoring control system, comprising:

a control module including a data analytics module and an artificial intelligence module, comprising computer-executable code stored in non-volatile memory; and a remote monitoring control center having at least a portion of a microprocessor including a processor and configured to communicate with remote monitoring control devices disposed at a plurality of autonomous devices;

wherein the control module and the remote monitoring control center are configured to:

receive processed data from the remote monitoring control devices, the processed data processed by the remote monitoring control devices based on data collected at the plurality of autonomous devices when the plurality of autonomous devices are autonomously operating without control by the remote monitoring control center;

train artificial intelligence as a function of at least one of the processed data received from the remote monitoring control devices or external data sources;

determine an incident risk level of each of the plurality of autonomous devices operating without control by the remote monitoring control center based on the artificial intelligence;

stop autonomous control of at least one of the plurality of autonomous devices based on the incident risk level changing from a safe level to an unsafe level or a dangerous level;

hand off full control of the at least one of the plurality of autonomous devices to the remote monitoring control center based on the incident risk level being the unsafe level or the dangerous level;

wherein the incident risk level is based on data communication between the remote monitoring control devices;

wherein the data communication comprises real-time visual data that comprises visual views captured by the remote monitoring control devices in a same environment as monitored by the remote monitoring control devices; and adjust the incident risk level based on controlling a movement of at least one of the plurality of autonomous devices.

15. The remote monitoring control system of claim 14, wherein the incident risk level is determined based on a criterion determining whether an object visually encoded by an image sensor data of the processed data transferred by one of the remote monitoring control devices disposed on one of the autonomous devices affects an operation of at least another of the autonomous devices.

16. The remote monitoring control system of claim 15, wherein the control module and the remote monitoring control center are further configured to determine an incident risk margin based on comparing the incident risk level with a predetermined safe risk level threshold.

17. The remote monitoring control system of claim 16, wherein the predetermined safe risk level threshold is predetermined by the artificial intelligence being configured as a function of historical training data captured by a test remote monitoring control device.

18. The remote monitoring control system of claim 16, wherein the control module and the remote monitoring control center are further configured, in response to determining that the incident risk margin is less than a predetermined safe minimum risk margin, to:
  take control of at least one of the plurality of autonomous devices, which is operating at the incident risk margin that is less than the predetermined safe minimum risk margin, by transferring data to one or more remote monitoring control devices; and
  increase a separation distance between two or more of the plurality of autonomous devices by changing a velocity vector of the at least one of the plurality of autonomous devices by controlling an operation of the at least one of the plurality of autonomous devices.

19. The remote monitoring control system of claim 18, wherein the control module and the remote monitoring control center are further configured to:
  restore the incident risk level to the safe level for the at least one of the plurality of autonomous devices based on controlling the operation of the at least one of the plurality of autonomous devices; and
  return control to the at least one of the plurality of autonomous devices when the safe level for the plurality of autonomous devices is restored.

20. The remote monitoring control system of claim 19, wherein restoring the incident risk level to the safe level includes determining the level based on comparing an incident risk to the predetermined safe minimum risk margin.

21. The remote monitoring control system of claim 16, wherein the control module and the remote monitoring control center are further configured, in response to determining that the incident risk margin is equal to or greater than a predetermined safe minimum risk margin, to determine the incident risk level is the safe level.

22. A method, comprising:
  providing a remote monitoring control center including a processor;
  configuring the remote monitoring control center to communicate with remote monitoring control devices disposed at a plurality of autonomous devices;
  receiving processed data from the remote monitoring control devices, the processed data processed by the remote monitoring control devices based on data collected at the plurality of autonomous devices when the plurality of autonomous devices are autonomously operating without control by the remote monitoring control center;
  training artificial intelligence as a function of the processed data received from the remote monitoring control devices and external environment sources of data related to the autonomous devices;
  determining an incident risk level of each of the plurality of autonomous devices operating without control by the remote monitoring control center based on the artificial intelligence;
  stopping autonomous control of at least one of the plurality of autonomous devices and taking full control of the at least one of the plurality of autonomous devices when the incident risk level changes from a safe level to an unsafe level or a dangerous level;
  returning autonomous control to the at least one of the plurality of autonomous devices when the safe level of the incident risk level is restored;
  wherein the incident risk level is based on data communication between the remote monitoring control devices;
  wherein the data communication comprises real-time visual data that comprises visual views captured by the remote monitoring control devices in a same environment as monitored by the remote monitoring control devices; and
  adjusting the incident risk level based on controlling a movement of at least one of the plurality of autonomous devices.

23. The method of claim 22, further comprising, in response to identifying an incident based on the artificial intelligence trained as a function of the processed data, determining one or more items involved in the incident and damage to the one or more items based on the processed data from the remote monitoring control devices.

24. The method of claim 23, further comprising:
  determining, based on the artificial intelligence, if the at least one of the plurality of autonomous devices is safely movable autonomously from a first location where the incident occurred to a second location; and
  initiating a movement of the at least one of the plurality of autonomous devices autonomously from the first location to the second location when it is determined that the at least one of the plurality of autonomous devices is safely movable autonomously from the first location to the second location.

25. The method of claim 23, wherein the one or more items include at least one selected from the group of autonomous devices, passengers, pedestrians, animals, physical objects, and combinations thereof.

26. The method of claim 22, further comprising:
  displaying a first indication on a user interface of the remote monitoring control center when the incident risk level is the safe level;
  displaying a second indication on the user interface of the remote monitoring control center when the incident risk level is the dangerous level; and
  displaying a third indication on the user interface of the remote monitoring control center when the incident risk level is the unsafe level.

27. The method of claim 26, wherein:
the first indication is a human-visible green indication;
the second indication is a human-visible yellow indication: and
the third indication is a human-visible red indication.

* * * * *